US006917935B2

(12) United States Patent
Zwiegincew et al.

(10) Patent No.: US 6,917,935 B2
(45) Date of Patent: Jul. 12, 2005

(54) MANIPULATING SCHEMATIZED DATA IN A DATABASE

(75) Inventors: Arthur Zwiegincew, Bothell, WA (US); Mark H. Lucovsky, Sammamish, WA (US); Christian Kleinerman, Bellevue, WA (US); Eugene N. Nonko, Redmond, WA (US); Shaun D. Pierce, Samunamish, WA (US)

(73) Assignee: Microsoft Corporation, Redmond, WA (US)

( * ) Notice: Subject to any disclaimer, the term of this patent is extended or adjusted under 35 U.S.C. 154(b) by 506 days.

(21) Appl. No.: 10/184,223

(22) Filed: Jun. 26, 2002

(65) Prior Publication Data

US 2004/0006563 A1 Jan. 8, 2004

(51) Int. Cl.$^7$ .............................................. G07F 17/30
(52) U.S. Cl. ............................................. 707/4; 707/10
(58) Field of Search .................................. 707/3, 4, 10

(56) References Cited

U.S. PATENT DOCUMENTS

| 6,272,488 | B1 | * | 8/2001 | Chang et al. ................... 707/4 |
| 6,356,906 | B1 | | 3/2002 | Lipert et al. ................... 707/10 |
| 6,721,730 | B2 | * | 4/2004 | Kiernan et al. ................. 707/3 |
| 6,785,673 | B1 | * | 8/2004 | Fernandez et al. ............. 707/3 |
| 2001/0037345 | A1 | * | 11/2001 | Kieman et al. ............. 707/513 |

OTHER PUBLICATIONS

OS/2 EE Database Manager SQLJRA Remote Protocol, Jan. 1993, IBM Technical Disclosure Bulletin, vol. 36, Issue 1, p. 31–36.*

Simplification of Queries in relational Data Bases, Mar. 1976, IBM Technical Disclosure Bulletin, vol. 18, Issue 10, p. 3518–3519.*

Lee, Dongwon and Chu, Wesley W.; "CPI: Constraints–Preserving Inlining algorithm for mapping XML DTD to relational schema," Data & Knowledge Engineering, vol. 39, No. 1, pp. 3–25.

Mamou, J.C.; Souza, C.; Abiteboul, S.; Aguilera, V.; Ailleret, S.; Amann, B.; Cluet, S.; Hills, B.; Hubert, F.; Marian, A.; Mignet, L.; Tessier, B.; Vercoustre, A.M.; and Milo, T.; "XML repository and Active Views Demonstration,"; Very Large Data Bases. Proceedings of the Twenty–Fifth International Conference on Very Large Data Bases, pp. 742–745.

Shanmugasundaram, Jayavel; Shekita, Eugene; Kiernan, Jerry; Krishnamurthy, Rajasekar; Viglas, Efstratios; Naughton, Jeffrey; and Tatarinov, Igor; "A General Technique for Querying XML Documents using a Relational Dababase System,"; SIGMOD Record, vol. 30, No. 3, pp. 20–26.

(Continued)

Primary Examiner—Jack M. Choules
(74) Attorney, Agent, or Firm—Workman Nydegger

(57) ABSTRACT

Methods, systems, and computer program products for accessing data where the data store provider is abstracted from both the data manipulation language used to access the data and the schema that describes the data. A received request structured in accordance with the data manipulation language is represented in an intermediate form. From the intermediate representation, a native request for any of one or more data store providers may be produced. Before being returned to the requester, a native response from data store provider may be formatted so that it is structured in accordance with the data manipulation language used for the request. A given request received by one computer system may cause a procedure to be generated for accessing the data store provider. When a later request is received by second computer system, the previously generated stored procedure may be reused if applicable.

12 Claims, 19 Drawing Sheets

OTHER PUBLICATIONS

Liang, Yuqi; Zhou, Aoying; Zheng, Shihui; Zhang, Long; and Ji, Wenyun; "Enhancing XML Data Processing in Relational System with Indices,"; Advances in Web–Age Information Management. Second International Conference, WAIM 2001 Proceedings (Lecture Notes in Computer Science vol. 2118, pp. 168–175.

Manley, Kevin; "Querying Databases with XML Exemplars,"; Windows Developer Magazine, vol. 13, No. 3, pp. 27–33.

Al–Khalifa, Shurug; Jagadish, H.V.; Koudas, Nick; Patel, Jignesh M.; Srivastava, Divesh; and Wu, Yuqing; *Structural Joins: A Primitive for Efficient XML Query Pattern Matching*,"; Proceedings 18th International Conference on Data Engineering, pp. 141–152.

Kinutani, Hiroko; Yoshikawa, Masatoshi; and Uemura, Shunsuke; *Identifying Result Subdocuments of XML Search Conditions*,"; Proceedings 2000 Kyoto International Conference on Digital Libraries: Research and Practice, pp. 254–261.

Miller, John A. and Sheth, Sonali; "Querying XML documents,"; IEEE Xplore, vol. 19, No. 1, pp. 24–26.

Fernandez, Mary; Morishima, Atsuyuki; and Suciu, Dan; "Efficient Evaluation of XML Middle–ware Queries,"; International Conference on Management of Data and Symposium on Principles of Database Systems. Proceedings of the 2001 ACM SIGMOD International Conference on Management of Data, pp. 103–114.

* cited by examiner

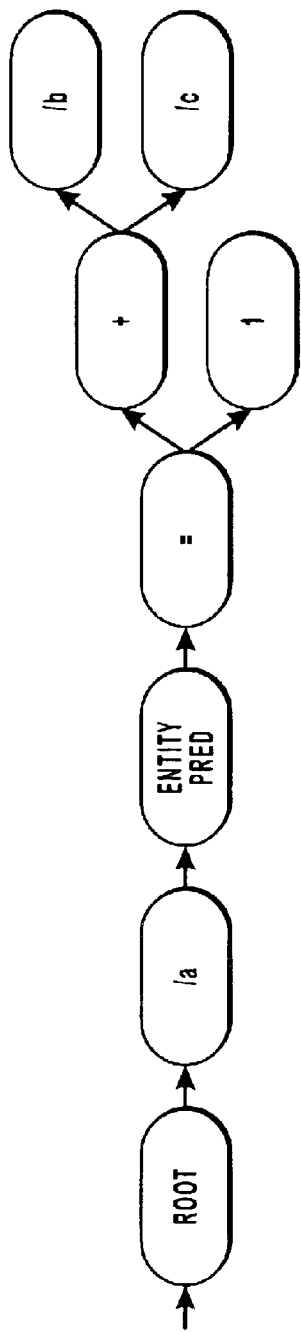
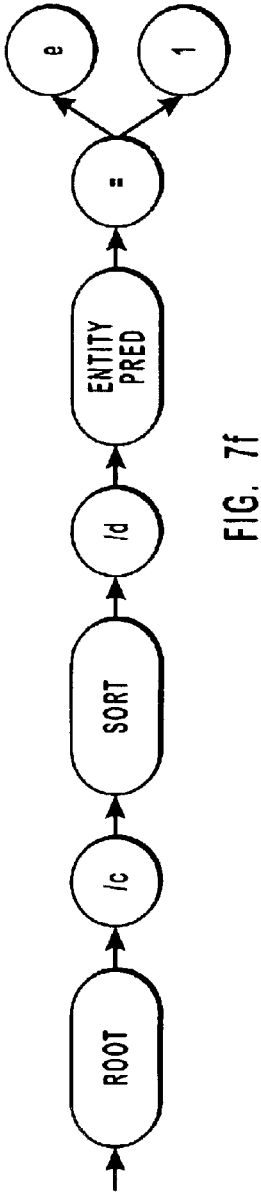
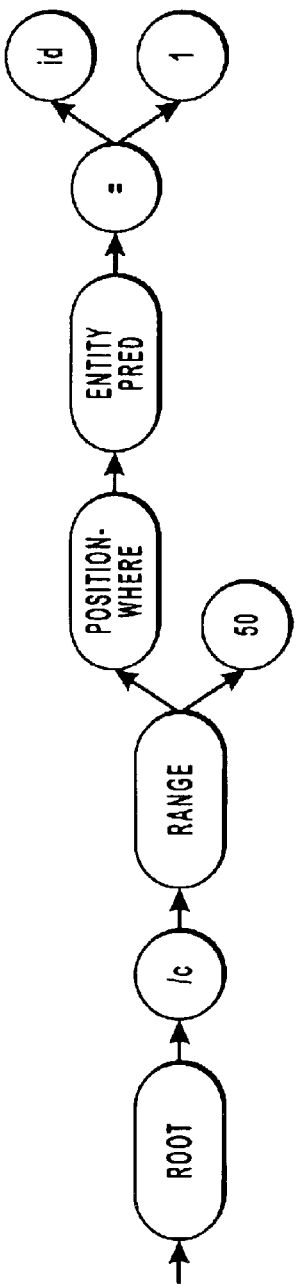
FIG. 7e
FIG. 7f
FIG. 7g

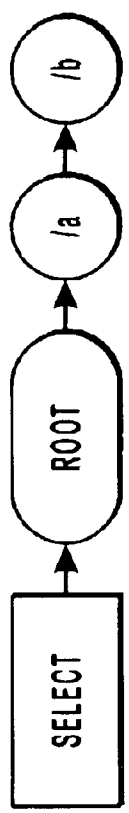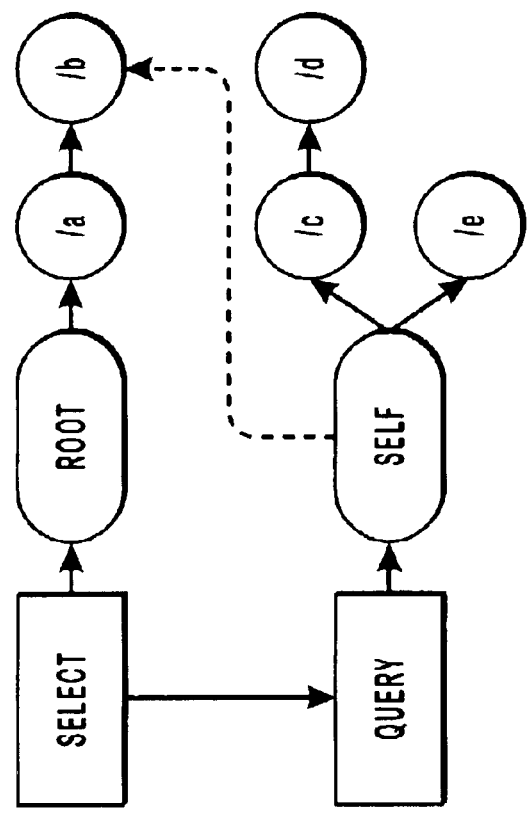
FIG. 8a
FIG. 8b

MANIPULATING SCHEMATIZED DATA IN A DATABASE

CROSS-REFERENCE TO RELATED APPLICATIONS

N/A

BACKGROUND OF THE INVENTION

1. The Field of the Invention

The present invention relates to the field of data access. Specifically, the present invention relates to methods, systems, and computer program products for accessing data where the data store provider is abstracted from the data manipulation language used to access the data.

2. Background and Related Art

Because it provides significant flexibility in exchanging data between computer systems, eXtensible Markup Language ("XML") continues to grow in popularity. At least in part, XML's flexibility is achieved through tags or markups that define data elements and attributes. To define semantically meaningful data relationships, XML tags may be arranged in a hierarchical schema with an indicator for the number of data elements to expect at various levels within the schema. For example, it is common for a schema to dictate that at a particular level, a given data element is expected exactly once, zero or once, zero or more times, etc.

Storage mechanisms for data defined by hierarchical schemas may take a variety of forms and are not necessarily specific or native to the underlying hierarchical schema. Although native storage mechanisms typically offer performance, design, and other benefits, there are often significant resource requirements for supporting multiple native storage mechanisms. For example, relational database management systems ("RDBMSs") supporting Structured Query Language ("SQL") are commonplace in many organizations. As a result, RDBMSs are likely to make use of existing hardware, software, support and administration personnel, design expertise, etc., whereas introducing some other storage mechanism is more likely to require additional hardware, software, training, and personnel. RDBMSs also represent a relatively mature and stable technology, offering excellent performance and scalability. Accordingly, using an RDBMS is attractive even if it lacks native support for some external aspects of a particular hierarchical model. Of course, other storage implementations may offer other benefits.

In order to obtain the benefits of each, some applications may combine the storage benefits of a given storage implementation with the communication benefits of XML. One of the problems typically encountered in combining diverse technologies is the potential for introducing interdependencies such that changes in one technology require corresponding changes in the other technology. Closely bound technologies also tend to limit the ability to select the most appropriate technology for a given application or organization. For example, a specialized technology that performs particularly well in a given situation may be overlooked in favor of a more generalized technology that performs better on average, and/or an organization may be unable to leverage existing resources that for whatever reason are not supported.

More generally, similar interdependency problems may be encountered when using an XML data manipulation language with any data store provider. RDBMSs supporting SQL are merely one example of data stores that are currently in wide-spread use. For any particular XML data manipulation language used for communication there are numerous corresponding options for a store provider, including many RDBMS implementations. Accordingly, methods, systems, and computer program products for accessing data where the data store provider is abstracted from the XML data manipulation language used to access the data are desired.

BRIEF SUMMARY OF THE INVENTION

The present invention relates to methods, systems, and computer program products for accessing data where the data store provider is abstracted from the data manipulation language used to access the data and the schema that describes the data. A received request to manipulate the data of an underlying data store provider is represented in an intermediate form. The request is structured in accordance with a data manipulation language. From the intermediate representation, a request for any of one or more data store providers may be produced, which abstracts the data manipulation language from the underlying data store. A native request corresponding to a specific data store provider is produced from the intermediate form.

Before being sent to the requester, a native response from the data store provider may be formatted so that it is structured in accordance with the data manipulation language used for the request. For example, the relational response of an RDBMS data store provider may be formatted in accordance with the schema and data manipulation language and sent to the requestor as a response. A given request received by one computer system may cause one or more stored procedures to be generated for accessing the data store provider. When a later request is received by second computer system, the previously generated one or more stored procedures may be reused if applicable.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which:

FIGS. 7a–7g are block diagrams illustrating specific examples of XML nodesets specified in an XML data manipulation language;

FIGS. 8a–8e are block diagrams illustrating example logical steps that represent logical operations to be performed on XML nodes specified in an XML data manipulation language;

DETAILED DESCRIPTION OF THE PREFERRED EMBODIMENTS

The present invention extends to methods, systems, and computer program products for accessing data where the data store provider is abstracted from the data manipulation language used to access the data and the schema that describes the data. As indicated above, eXtensible Markup Language ("XML") may be used to define relationships for data independent of the data's underlying storage or management mechanisms. XML uses tags or markups to define data elements and attributes, whereas others schemas, such as those defining relational databases that are accessed through Structured Query Language ("SQL") typically do not use tags or markups. It should be emphasized, however, that describing embodiments of the present invention in terms of SQL is exemplary only and should not be interpreted as limiting the invention's scope. Accordingly, as used in this application, the term "schema" should be interpreted broadly to encompass virtually any technique for describing how data is structured, organized, and/or related, including techniques for describing the structure, organization, and/or relationships of relational data, object oriented data, XML data, etc.

Figure 1:
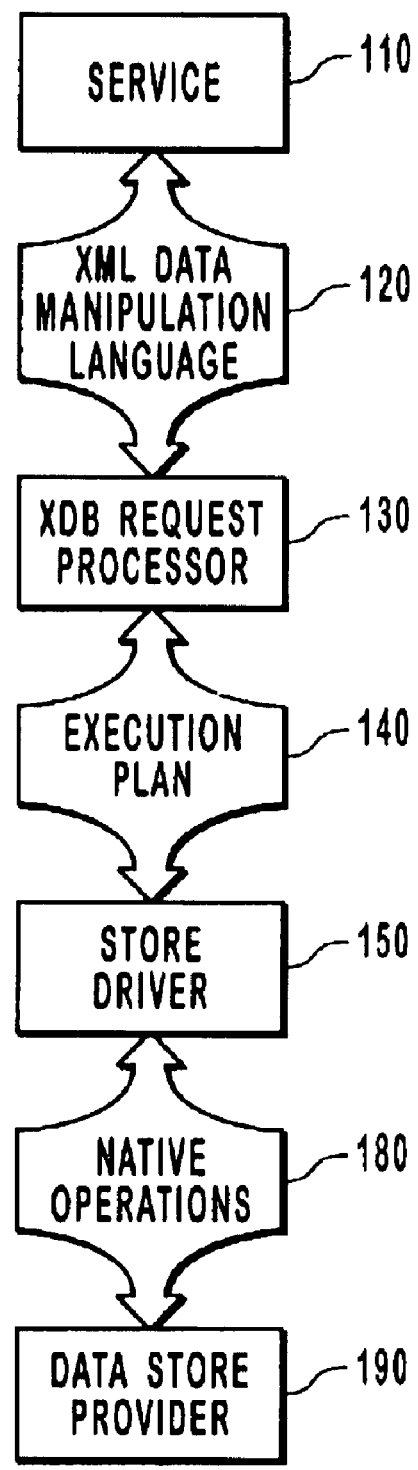
FIG. 1 is a high-level block diagram illustrating a data store provider that is abstracted from the eXtensible Markup Language ("XML") data manipulation language used to access the data and the XML schema that describes the data.

FIG. 1 is a high-level block diagram illustrating a data store provider that is abstracted from the XML data manipulation language used to access the data and the XML schema that describes the data. The primary role for XDB request processor 130 is to act as an intermediary between service 110 and store driver 150. (The term "XDB" is used because to service 110, XDB request processor 130 makes data store provider 190 appear to be an XML database, regardless of the underlying implementation of data store provider 190.) XDB request processor 130 receives requests from service 110 in XML data manipulation language 120 and translates the requests into an internal or intermediate format, identified as execution plan 140, that is more suitable for processing. Store driver 150 uses execution plan 140 to generate native data operations 180 for data store provider 190. When store driver 150 completes a request by receiving a native data operation 180 back from data store provider 190, the XDB request processor 130 translates results stored in the execution plan 140 into an XML data manipulation language 120 response that is returned to service 110.

Figure 2:
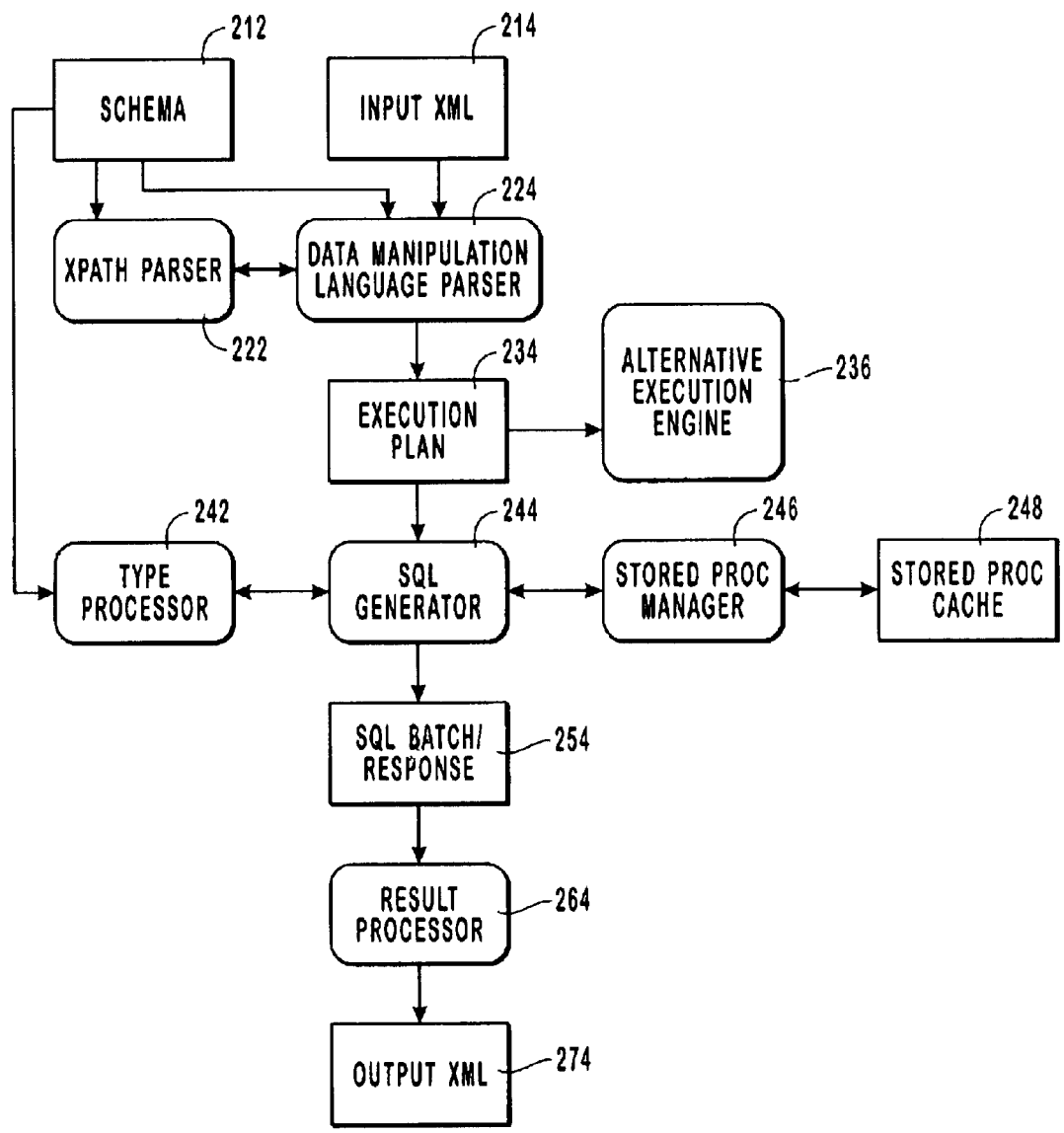
FIG. 2 shows a block diagram for an example system that uses an XML data manipulation language and SQL to access an RDBMS data store provider.

FIG. 2 shows a block diagram for an example system that uses an XML data manipulation language and SQL to access an RDBMS data store provider. Blocks with square corners represent data and blocks with rounded corners represent processing operations. As described above, it may be desirable or necessary to store and manage XML data using SQL resources for any of various reasons. Accordingly, schema 212 in an XML schema that describes the organization of the data to be accessed. Input XML 214 includes some type of reference to the branches of the XML schema, such as an XPath statement for querying, adding, deleting, or updating the XML data. It should be noted that the input XML 214 does not need to know the underlying storage or management mechanism for the XML data.

Data manipulation language parser 224 and XPath parser 222 determine the type of operation invoked by the input XML 214. The input XML also identifies the data on which the operation should be performed. XML parser 224 converts the input XML 214 into an internal or intermediate representation that is more suitable for processing. The result of this conversion is execution plan 234. For most conventional database applications, generating an execution plan is an undesirable operation because the database and the application accessing the database tend to be tightly coupled. Accordingly, to enhance performance the application usually supports a number of predefined operations that are optimized for the database. Ad hoc data manipulation may not be allowed. If an application supports ad hoc data manipulation, requests are typically generated using the native data manipulation language for the database, which then may be optimized before being submitted to the database. Under these circumstances, generating an intermediate representation of a request, where even the request itself is in a language that is foreign to the database, may introduce unacceptable performance overhead, and therefore be undesirable.

Execution plan 234 is not specific to any particular data store provider and may be used by an alternative execution engine 236 or SQL generator 244. SQL generator 244 uses type processor 242 to assure accurate data typing (XML has relatively less strict typing that does SQL). Stored procedure manager 246 and stored procedure cache 248 contain SQL statements for accessing SQL data. If no stored procedures exist for the input XML 214, SQL generator 244 generates the corresponding SQL and uses stored procedure manager 246 and stored procedure cache 248 to store the generated SQL.

SQL generator 244 produces SQL batch/response 254 in response to execution plan 234. Results processor 264 takes the SQL batch/response 254 and converts it to output XML 274. Accordingly, the requester has no need to know about the underlying storage and management mechanism for the XML data being accessed. From the requesters perspective, input XML 214 performs some operation on XML data and output XML 274 is the response. That the XML data happens to be stored in an RDBMS and managed using SQL is transparent. Nevertheless, in some embodiments, the allowable XML may be restricted to simplifying the foregoing process. Additional detail for particular embodiments of the present invention that implement the foregoing functionality are described below with reference to various subsequent Figures.

Figure 3:
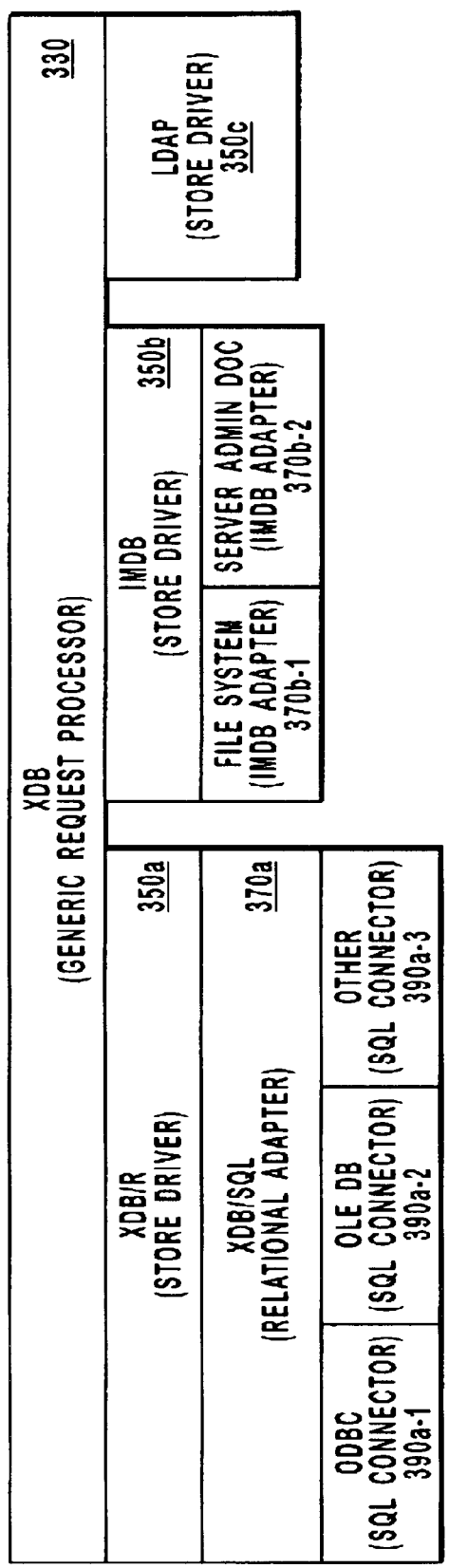
FIG. 3 is a block diagram illustrating several example implementations for accessing various data stores with a single XML data manipulation language.

FIG. 3 is a block diagram illustrating several example implementations for accessing various data stores with a single XML data manipulation language. Data access is implemented as a software stack, similar to network protocol stacks. The top layer, XDB 330, implements the service interface and provides a generic request processor. In other words, XDB 330 does not target any particular storage technology. The next layer, the store driver layer, processes requests with specific knowledge of the underlying storage technology. For example, XDB/R 350*a* targets relational databases, IMDB 350*b* targets in-memory databases, and LDAP 350*c* targets lightweight directory access protocol ("LDAP") databases. The store drivers are plug-in components and may be developed for other target databases. As shown, some store drivers may be designed as a collection of layered components, which may be referred to collectively as a storage stack. It should be emphasized, however, that FIG. 3 merely illustrates example implementations and should not be interpreted as limiting the present invention's scope.

XDB/R 350*a* is a generic XML data manipulation language to relational mapping layer. XDB/R 350*a* exposes an interface for interacting with one or more relational adapters, such as XDB/SQL 370*a*. The adapter layer is specific to a particular data store provider (e.g., a particular database server). The SQL connector layer provides a connection to the particular data store, such as an ODBC 390*a*-1 connection, an OLE DB 390*a*-2 connection, or some other 390*a*-3 connection. At this stage, it should be clear that details in the lower layers of the storage stack are completely abstracted from the requesting service, the XML data manipulation language, and the XML schema that describes the data being accessed.

Note that as shown in FIG. 3, storage stacks do not necessarily require any particular number of software layers. For example, the relational storage stack includes three layers: the XDB/R 350*a* store driver layer, the XDB/SQL adaptor layer, and a layer containing various SQL connectors; the in memory storage stack includes two layers: the IMDB 350*b* store driver layer, and an adaptor layer containing file system adaptor 370*b*-1 and server administration document adaptor 370*b*-2; the LDAP storage stack includes a single layer: the LDAP 350*c* store driver layer. Those of skill in the art will recognize many other arrangements are possible, including additional arrangements for relational, in memory, and LDAP storage stacks.

Figure 4:
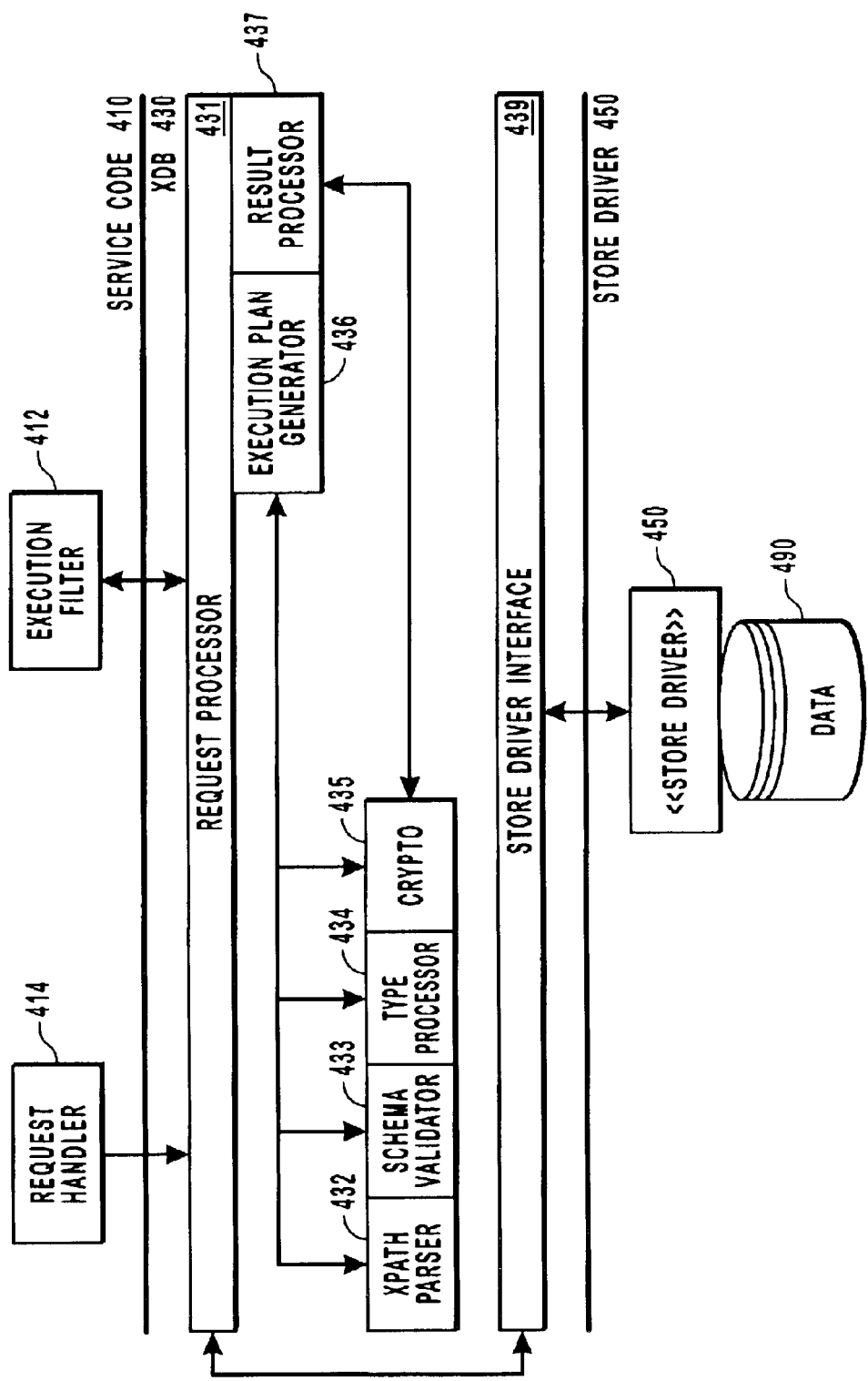
FIG. 4 is a block diagram illustrating additional detail for a generic request processor.

FIG. 4 is a block diagram illustrating additional detail for a generic request processor, such as XDB 430. The request processor 431 receives requests from a request handler 414 within the service code 410 and dispatches the request to other components within XDB 430. (Execution filter 412 relates to functionality that may be associated with various processing steps within XDB 430. For example, certain checks, logging, etc., may be performed immediately before and/or immediately after the processing blocks shown for XDB 430, such as for debugging, performance monitoring, and the like.) More specifically, request processor component 431 (i) uses the execution plan generator 436 to parse the request and generate an intermediate representation of the request, as known as an execution plan, (ii) calls the store driver 450 to process the request, (iii) calls the result processor 437 to generate an XML response, and (iv) returns the response to the caller. Interaction with store driver 450 and data 490 occurs through store driver interface 439.

The execution plan generator 436 takes an data manipulation language request, which has been parsed by an data manipulation language parser into an internal XML tree and, with the assistance of other components, converts the XML request into an execution plan. XPath parser 432 parses the XPath expressions of the XML request into internal structures that are used in execution plans. Parsing is performed with knowledge of the schema and the request context so that output structures include links to schema items, rather than a simple parse tree. Schema validator 433 ensures that when a request attempts to insert XML data into a data store provider document, the data is schema-valid. The type processor 434 performs type analysis on parsed expression trees. Type analysis allows the store driver 450 to process execution plan expressions with strongly-typed functions. Crypto 435 is responsible for encryption and decryption of data stored by the underlying data store provider using the 3DES algorithm and a key supplied by the requesting service. The schema may indicate, either directly or indirectly, what data should be encrypted.

Figure 5:
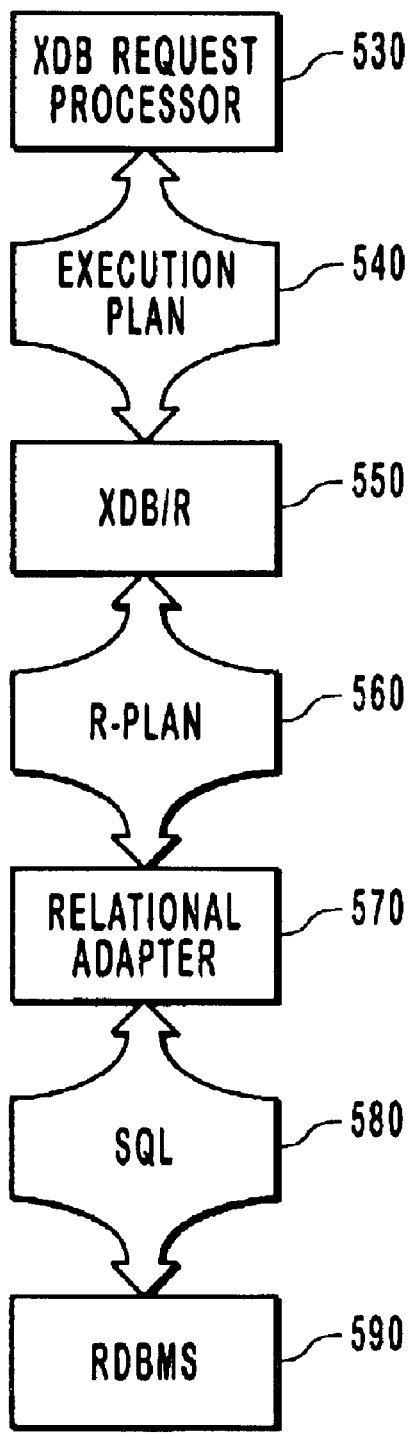
FIG. 5 is high-level block diagram illustrating an RDBMS data store provider that is abstracted from the XML schema that describes the data and the XML data manipulation language used to access the data.

FIG. 5 is high-level block diagram illustrating an RDBMS data store provider 590 that is abstracted from the XML schema that describes the data and the XML data manipulation language used to access the data. As describe above in connection with FIG. 3, XDB/R 550 is a generic store driver for RDBMSs. XDB/R 550 translates the requests from executions plans 540 (generated by XDB request processor 530) into expressions using abstract relation operations, such as selection, projection, cross product, filtering, etc. These abstract relation expressions are identified as R-plans 560 (for "relational plans"). R-plans 560 are executed by the next layer in the relational storage stack, relational adapter 570, which produces SQL expressions 580 for a particular SQL DBMS 590.

Figure 6:
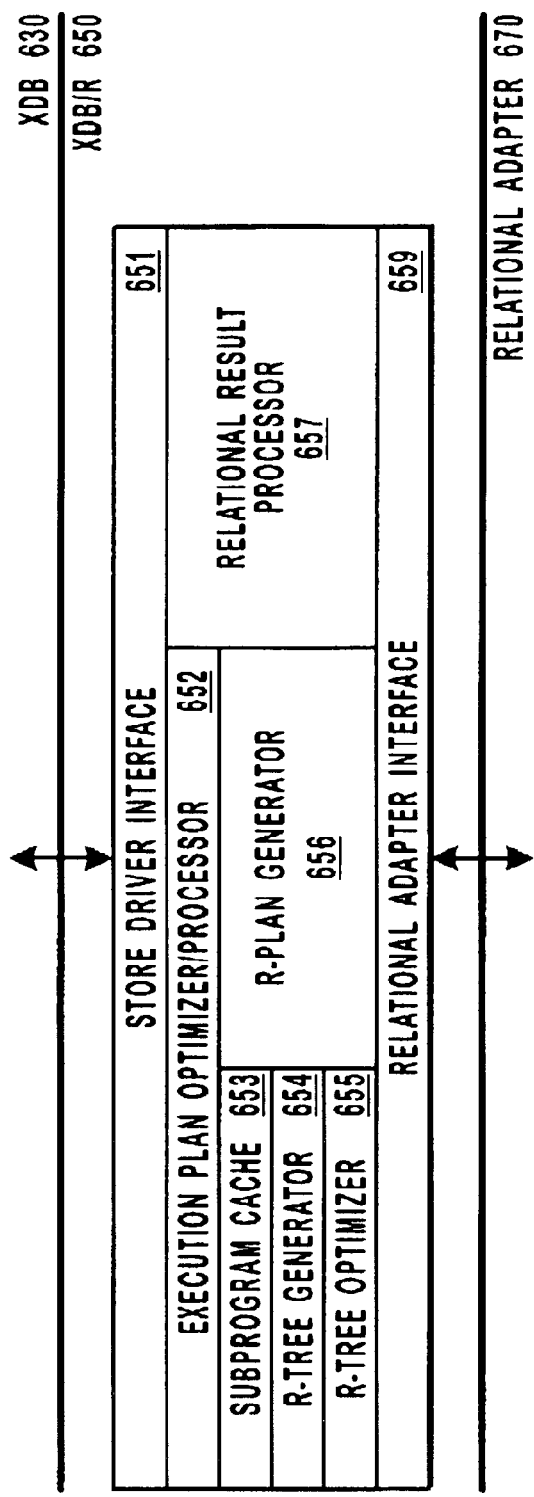
FIG. 6 is a block diagram illustrating additional detail for the RDBMS store driver.

FIG. 6 is a block diagram illustrating additional detail for a store driver, such as XDB/R 650. Store driver interface 651 implements entry points for execution plan requests from XDB 630, such as for opening and closing store instances, opening, executing, and closing requests, etc. Ultimately, these requests are forwarded on to relational adapter 670 for SQL generation.

Execution plan optimizer/processor 652 performs two main functions. First, it analyzes the required tasks and annotates the execution plan with relational-specific hints. For example, it notes that some XML nodes map to the same primary relation. Second, it breaks apart the execution plan and creates groups of related structures that can be executed efficiently. These groups of related structures are executed by relational subprograms, which may be thought of as abstract stored procedures.

When the execution plan optimizer/processor 652 determines that a particular subprogram is needed, it queries the subprogram cache 653. Subprogram cache 653 is responsible for tracking which subprograms exist for the relational storage stack. If a subprogram does not exist, one is created using the R-tree generator 654. Relational subprograms roughly correspond to individual relational algebra expressions. XDB/R's internal representations of these expressions are called R-trees. Constants in these relational expressions are abstracted out and become subprogram parameters to reduce the number of subprograms that are needed.

After an R-tree is created, it is passed to the R-tree optimizer 655, which uses optimization hints from the execution plan optimizer/processor 652 to create more efficient relational expressions. This optimization is specific to a particular XML schema and is not something that a generic relational optimizer could do. The underlying relational adapter 670 is called to create the subprogram by converting the abstract relational expressions into expressions that are native to a particular RDBMS. In some embodiments, the relational adapter creates the subprograms as SQL stored procedures. Once all of the required subprograms exist, the R-plan generator 656 translates the annotated execution plan into an R-plan. The R-plan is suitable for direct execution by the underlying relational adapter 670 and includes calls to the previously generated subprograms, as needed. Interaction between XDB/R 650 and relation adapter 670 occurs through relational adapter interface 659. Other store drivers may follow similar designs.

Relational adapter 670 responds to an R-plan with the relational results from the data store. Relational result processor 657 is responsible for placing the relational results in the execution plan where they can be accessed by upper layers of the storage stack. For example, as described above, an XML response may be generated from the relation results stored in the execution plan.

Figure 7:
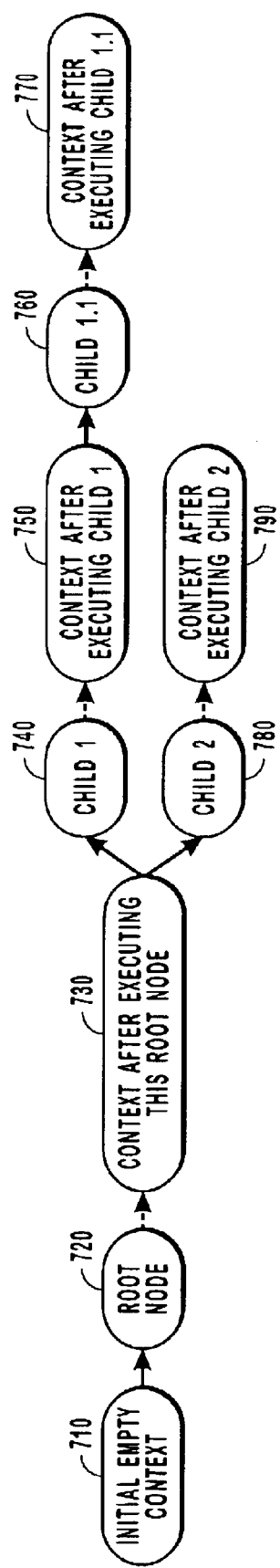
FIG. 7 shows a block diagram illustrating the general representation for selecting XML nodesets specified in an XML data manipulation language.

FIG. 7 shows a block diagram illustrating an example high-level representation for identifying XML nodes specified in an XML data manipulation language. An execution plan is a list of logical steps of various types. For example, there are step types used to mark nested transaction boundaries, select nodes, test node sets using predicates, insert data, delete data, query data, and query deleted data. These steps are referred to as L-steps (for "logical steps") and are explained in more detail below with respect to FIGS. 8a–8e. Before describing L-steps in detail, however, it will be helpful to introduce L-trees.

Data manipulation generally involves an object being manipulated (the "what" part of an expression) and a description of how the object should be manipulated (the "how" part of an expression). L-trees relate to selection—defining what is being manipulated. Accordingly, in describing execution plans, it is helpful to begin with a description of the internal node selection language for defining what data to manipulate. The internal node selection language may be expressed using L-trees.

L-trees are n-ary trees (trees where each node can contain any number of children) containing L-nodes. L-nodes represent logical operations of various kinds. Inputs to these logical operations are determined by the L-node's position in its L-tree. Each input is known as a context. Execution within an L-tree generally flows from the root down. L-trees are executed in order to select XML nodes. These XML nodes are contained in what is called the context.

The initial context 710 of the first operation in a tree (the root) is empty. After an L-node is executed, for example root node 720, a new context 730 is established. This new context is treated as input to all child nodes (or child operations), such as child 1 (740) and child 2 (780). Child 1 (740) produces a new context 750 that is passed to the next node, child 1.1 (760), which ultimately produces context 770. Similarly, child 2 (780) produces a new context 790. The context associated with the last selection operation becomes the output of an L-tree.

FIGS. 7a–7g are block diagrams illustrating specific examples of XML nodes identified by an XML data manipulation language. In particular, four types of L-nodes will be described with reference to FIGS. 7a–7g, including ITEMREF L-nodes, UNION L-nodes, CONSTANT L-nodes, and OPERATION L-nodes. ITEMREF nodes take XML nodes from their input contexts, apply an XPath-like navigation step to each one, and store the result of each navigation step in an output context. Each ITEMREF node is associated with a schema item.

Valid ITEMREF nodes types include: ROOT, CHILD, DESCENDANT, PARENT, and SELF. ROOT selects a virtual XML document root ("/"). The node has only one child-the actual document root, e.g. "mywidgets" as described in more detail below with reference to FIGS. 9a–9f. For every XML node in the context, CHILD selects all XML child nodes of the specified schema item. Similarly, for every XML node in the context, DESCENDANT selects all XML descendant nodes of the specified schema item. Although somewhat redundant, for every XML node in the context, PARENT selects its XML parent node. (Since the schema item of each node in the context in known, it follows that the schema item of each node's XML parent is also know. Therefore, the schema item reference in the PARENT ITEMREF node is redundant, but is verified.)

SELF nodes refer to a previously established context. There are two types of SELF nodes. If a given SELF node has an ITEMREF ancestor in the tree, then the context of this node is equal to the context of the ITEMREF ancestor. Otherwise (if no ITEMREF ancestor is found in the tree), the context of this node is equal to a context in a preceding L-tree (from a previous selection). In some respects, SELF is similar to the "." expression in XPath. SELF is generally used in two circumstances: (i) in predicates within expressions like /a[data( )='2'], and (ii) for relative expression, such as ./b.

Figure 7A:
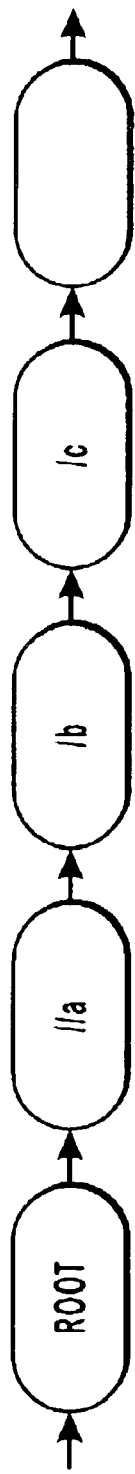

FIG. 7a is a visual representation of an L-tree of ITEMREF L-nodes. The XPath expression //a/b/c . . corresponds to a linear L-tree that contains the following L-nodes: ROOT, DESCENDANT(a), CHILD(b), CHILD(c), PARENT(b). In FIG. 7a, these ITEMREF L-nodes are labeled, ROOT, //a, /b, /c, and ". . " L-nodes.

Figure 7B:
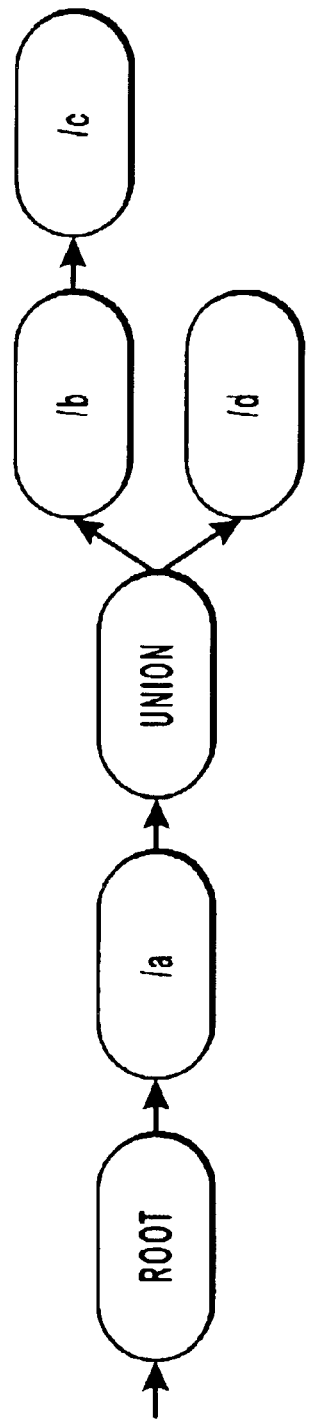

FIG. 7b is a visual representation of an L-tree that contains a UNION L-node. XDB works with heterogeneous node sets, i.e., node sets containing nodes belonging to different schema items. These node sets arise from XPath expressions such as //n, /a/*, and /a/(b/c|d). These sets may be expressed as unions of homogeneous node sets. XDB L-trees use a UNION L-node to represent the union operation. Unions work on the root "/" context as well as any other context. For example, /a/(b/c|d) is represented as shown in FIG. 7b. The L-tree contains ITEMREF L-nodes for ROOT and /a, followed by a UNION L-node of the ITEMREF L-nodes of /b and /c and the ITEMREF L-node /d.

Figure 7C:
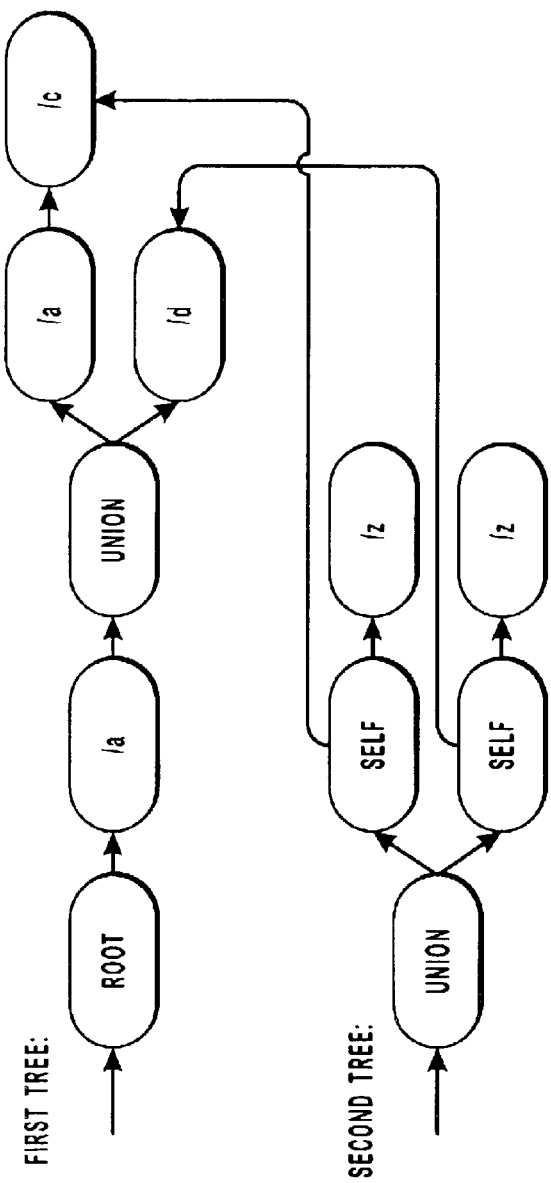

If an L-tree involving a UNION is followed by another L-tree corresponding to a relative select operation, then the second L-tree expresses the heterogeneity using a UNION of SELF nodes. For example, if the previous /a/(b/c|d) expression were followed by ./z, it would be represented as shown in FIG. 7c. Each of the two SELF nodes (which are preceded by a UNION node and followed by relative /z nodes) in the second tree point to a different homogenous context in the first tree. The first tree is identical to the tree of FIG. 7b.

XDB uses CONSTANT L-nodes to represent constant values. Each constant node is associated with a type. The list of possible constant types depends on the query language. One possible domain includes the set of all XML Schema types. In the case of XPath, the set may be limited to string, integer, and float. Apparent incompatibilities between type domains, such as XPath types and XML Schema types, may be mitigated by a type processor, such as type processor 434 of FIG. 4.

Figure 7D:
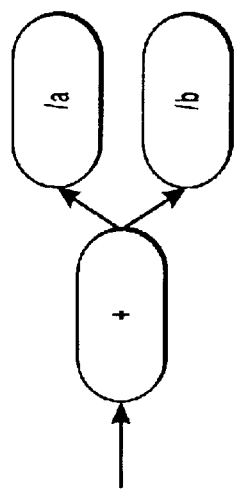

Various mathematical operations are represented using OPERATION L-nodes. Operations involve arguments, which are represented as child L-nodes, but a current L-tree context also may be an argument. Details vary depending on the operation type. Functions such as integer addition, floating point division, string length, and many others, are classified as entity-valued. Entity-valued functions have arguments that are individual entities of well-known types (corresponding to XML Schema types), as opposed to sets. These functions are applied to the arguments specified by child L-nodes. The allowed number of child L-nodes corresponds to the number of arguments. For example, ./a+./b is represented as shown in FIG. 7d. The L-tree contains an OPERATION L-node for + and ITEMREF L-nodes for /a and /b.

Set-valued functions apply to sets of entities. For instance, the XML functions COUNT, EXISTS and FORALL apply a predicate expression specified as a child L-tree, to the current context, and return a value corresponding to their semantics. Predicate expressions are described in more detail below with respect to FIGS. 7e–7g.

Predicate operations loosely correspond to the WHERE clause in SQL. They apply predicate expressions to the current context. At least to that extent, predicate operations are similar to set-valued functions. There are two types of predicate nodes: entity predicates and set predicates. Entity predicates arise from XPath predicates and apply to each item in the set. All entities in the context that satisfy the predicate are left in the result set—others are removed. Set predicates arise from test expressions and other sources. Set predicates loosely correspond to SQL's HAVING clause, as they apply to sets. If the node set satisfies the predicate, which applies to the entire set at once, the result set is not affected. Otherwise, the result set is empty.

FIG. 7e is an L-tree that corresponds to the XPath expression /a[./b+./c=1]. The L-tree contains ITEMREF L-nodes for ROOT and /a and an entity predicate OPERATION L-node, labeled ENTITY PRED, followed by the predicate to satisfy, including OPERATION L-nodes for entity functions = and +, a constant L-node 1, and ITEMREF L-nodes for /b and /c.

Operation L-nodes also include several special operations: SORT, SORT_REV, and RANGE. SORT and SORT_REV sort the nodes in the context according to a supplied key. (In special operations, contexts are treated as ordered sets.) For example, the L-tree illustrated in FIG. 7f represents all /c nodes sorted by the values of ./d, but only those where ./d/e=1. Other /c nodes (i.e., those without a ./d child) are treated as if the value of ./d were more than the maximum possible so that they come last. SORT_REV applies the reverse sort order. FIG. 7f corresponds to the XPath expression /c{sort(d[e=1])}. The L-tree contains ITEMREF L-nodes for ROOT and /c, a SORT OPERATION L-node, an ITEMREF L-node for /d, and an ENTITY PRED OPERATION L-node followed by the predicate to satisfy that includes an OPERATION L-node for the entity function =, an ITEMREF L-node for /e, and a constant L-node 1.

RANGE filters the context. It has two subtrees. The first subtree describes a one-based offset of the node to be selected. This subtree may be either a CONSTANT or an expression. The second subtree supplies the number of nodes following the first node to be selected. FIG. 7g corresponds to selecting the /c node with ./id=1 and the 49 nodes following it. POSITION-WHERE is a set-valued function that sets the context to begin with the first node that matches the predicate. If multiple nodes match the predicate, only the first is taken into account. The L-tree contains ITEMREF L-nodes for ROOT and /c, a RANGE OPERATION L-node, followed by a first subtree with a POSITION WHERE OPERATION L-node, an ENTITY PRED OPERATION L-node, and the predicate to satisfy—an OPERATION L-node for the entity function =, an ITEM-REF L-node for /id, and a CONSTANT L-node 1, and a second subtree with a CONSTANT L-node 50.

FIGS. 8a–8e are block diagrams illustrating example logical steps that represent logical operations to be performed on XML nodes specified in an XML data manipulation language. As indicated above in connection with FIG. 7, an execution plan is a list of logical steps of various types. These steps are referred to as L-steps (for "logical steps"), and include steps to mark nested transaction boundaries (BEGIN TRAN and END TRAN), select nodes (SELECT), test node sets using predicates (TEST), insert data (INSERT), delete data (DELETE), query data (QUERY), query deleted data (QUERY DEL), etc. (Note that INSERT and DELETE steps do not include leading slashes since these nodes correspond to XML nodes, rather than XPath location steps.) Each step may be thought of as a transformation of an execution state. The semantics of the execution plan is equivalent to the composition of all these transformations in the appropriate order.

Although at a high level XDB may appear linear, without branches, branching is possible. A step type TEST can set any of the available 32 predicate bits. (This approach is similar to one used by some microprocessors.) Other steps may be predicated on any state of any subset of predicate bits. By having two groups of steps predicate on opposite states, the effect of if . . . then . . . else may be achieved.

XDB execution plans also define logical transactions, and at times, it may be useful to define nested transactions. All steps between BEGIN TRAN and END TRAN L-steps form a nested transaction. Each nested transaction is attributed with an error mode. In addition to update blocks, an XML data manipulation language may define nested transactions around all operations that map to multiple data modification steps. Essentially, BEGIN TRAN pushes an error context on an abstract transaction stack and END TRAN pops it. Errors also pop the context. To help store drivers implement error handling, all logical steps contain references to their nearest BEGIN TRAN predecessor (or NULL if one does not exist).

SELECT L-steps add a node set to the execution context. The node set is determined by the supplied L-trees, which have the property that no ITEMREF node has more than one ITEMREF child. In one embodiment, all supported XPath expressions correspond to a SELECT step. FIG. 8a corresponds to select="/a/b" in one XML data manipulation language. The L-step illustrated in FIG. 8a includes: a SELECT L-step, and ITEMREF L-nodes for ROOT, /a, and /b. All SELECT, TEST, INSERT, DELETE, QUERY, and QUERY DEL L-steps point to a SELECT predecessor (or NULL if one does not exist). In this way they reference an existing context. For SELECT, the context reference is non-NULL if the select expression is relative. Relative SELECT steps contain SELF ITEMREF L-nodes.

TEST L-steps are similar to SELECT steps. They have the property that the root L-node is a predicate, either entity or set. The test is considered successful if the resulting node set is nonempty. Each TEST L-step specifies which execution state predicate bits are to be affected. (See, for example, FIG. 9d and the related description below.) If the test is successful, the corresponding predicate bits are set to one; otherwise, they are set to zero.

QUERY L-steps retrieve data from a node set. They contain L-trees with relative expressions (i.e., with a top-level UNION of SELF ITEMREF nodes or a top-level SELF ITEMREF node). The L-tree supplies the shape of the data to be retrieved. SORT, SORT_REV, and RANGE L-nodes are allowed in QUERY steps. For simple XPath expressions, the shape is the entire completion tree (i.e., at every level, all possible CHILD ITEMREF nodes exist). The query illustrated in FIG. 8b selects /b and everything below it. The L-steps illustrated in FIG. 8b include: a SELECT L-step, followed by ITEMREF L-nodes for ROOT, /a, and /b, and a QUERY L-step, followed by ITEMREF L-nodes for SELF (pointing to the context created by the SELECT L-step), /c, /d, and /e.

Some data views may require predicates in query trees. In other words, some nodes should be returned only if they have some property. The query illustrated in FIG. 8c, for example, is identical to the query shown in FIG. 8b, but it returns only those /a/b/e elements whose value is 2. Note that following the ITEMREF L-node for /e, an ENTITY PRED OPERATION L-node has been added, followed by the predicate to satisfy—an OPERATION L-node for the entity function =, a SELF ITEMREF L-node, and a CONSTANT L-node 2. In some embodiments, non-predicate OPERATION L-nodes may not be allowed outside of predicates in QUERY steps because direct calculations may be prohibited.

QUERY DEL L-steps are similar to QUERY steps, except they do not retrieve existing data, but rather data that has been deleted. For instance, XDB stores may track certain deleted data. It is not necessary to have a 1:1 mapping between data returned for this step and the actual set of deleted items matching the selection. In some embodiments, a superset of the actual set may be returned. It is also possible, if the motivation for QUERY DEL is to support data replication and synchronization, for example, that only the first level of data may be needed, with corresponding change numbers, version histories, and item IDs, without other children.

Figure 8C:
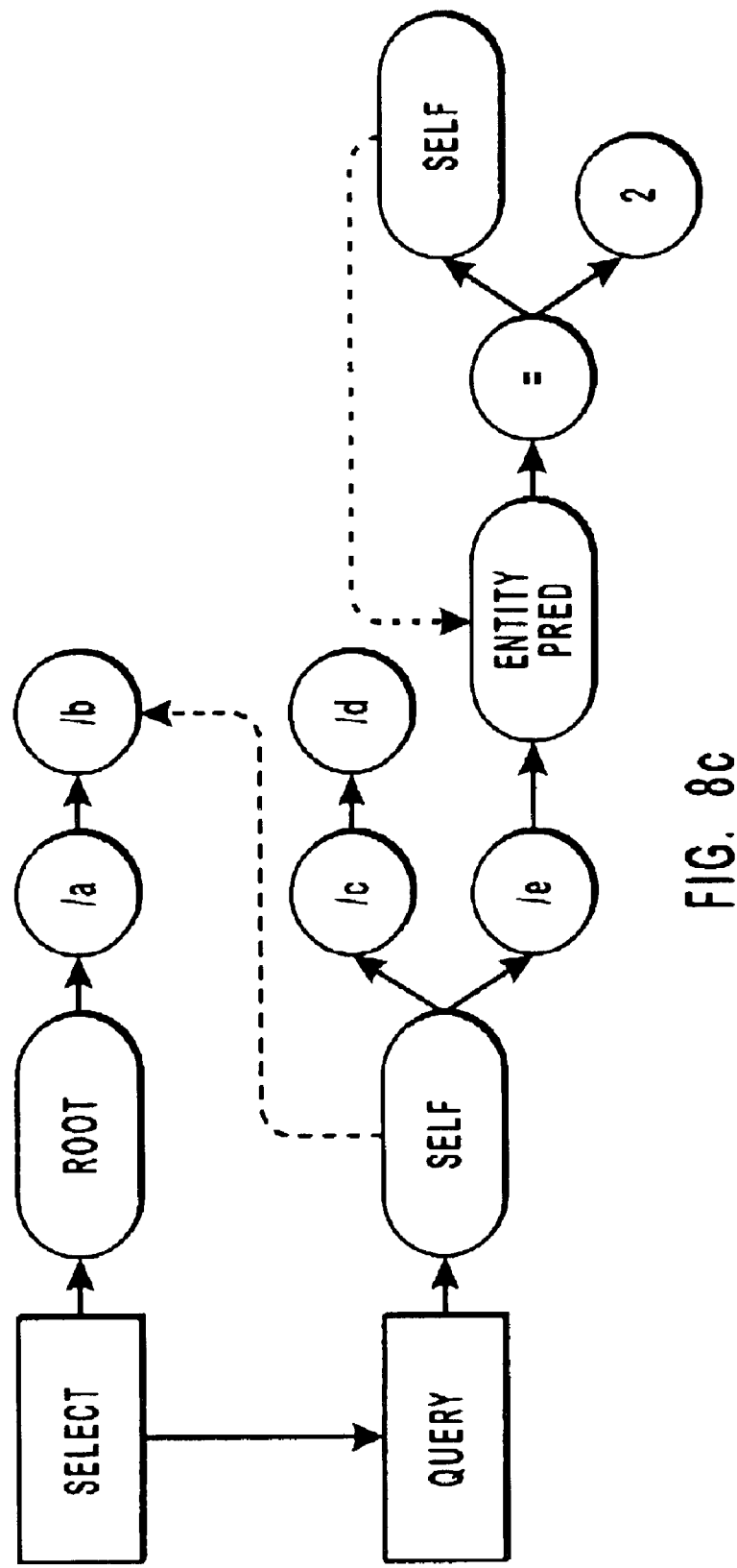
Figure 8D:
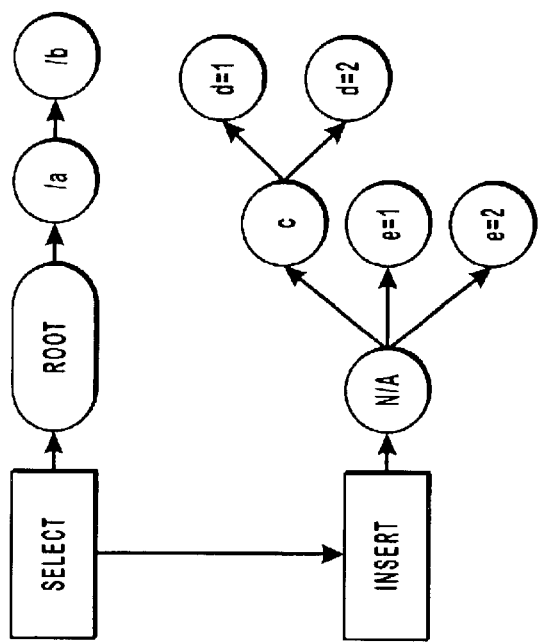

INSERT L-steps insert supplied XML data into a supplied context (by reference to a SELECT predecessor). The XML data may take the form of an XML tree, with the root node being ignored. FIG. 8d illustrates inserting the following XML into /a/b:

```
<c>
   <d>1</d>
   <d>2</d>
```

```
</c>
<e>1</e>
<e>2</e>
```

The L-steps illustrated in FIG. 8d include: a SELECT L-step, followed by ITEMREF L-nodes for ROOT, /a, and /b, and an INSERT L-step, followed by ITEMREF L-nodes for N/A (because the root is ignored), /c, /e=1, and /e=2 at the first level, and /d=1 and /d=2 at the second level as child nodes of /c. INSERT steps may be marked as for-replace, in which case they replace existing data. It is also possible to have no SELECT context for INSERT, in which case a new document with the supplied content is created.

Figure 8E:
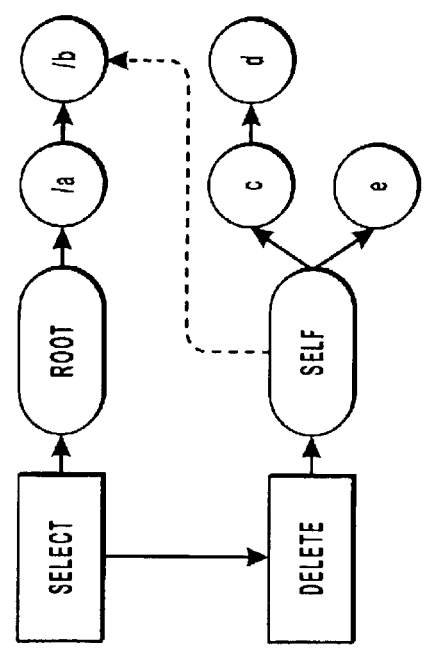

DELETE L-steps delete data from a supplied context. They contain L-trees with ITEMREF nodes. These trees contain the shape of the data to be deleted. Except for steps without a context (i.e., document deletion requests), the root is a SELF ITEMREF node. FIG. 8e illustrates L-steps that delete all /a/b nodes with their entire subtrees. The L-steps shown in FIG. 8e include: a SELECT L-step, followed by ITENREF L-nodes for ROOT, /a, and /b, and a DELETE L-step, followed by ITEMREF L-nodes for SELF, /c, /d (as a child of /c), and /e. In some cases, such as steps marked for-replace, only some child nodes are deleted. For these cases, the root SELF node is ignored, and its subtrees specify individual trees to be deleted, minus some nodes (e.g., item IDs, etc., which are preserved by replace operations.)

FIGS. 9a–9f are block diagrams illustrating example sequences of logical operations that represent an intermediate form of XML data manipulation language requests. The description of FIGS. 9a–9f explains how XDB maps XML data manipulation language requests into execution plans. The abbreviated schema illustrated below in Table I is used with reference to FIGS. 9a–9f. The {any} designation within the schema indicates that the schema allows user-defined items.

TABLE I (Example Schema)

```
<m:myWidgets changeNumber=" . . . " instanceId=" . . . ">_{1 . . . 1}
   <hs:catDef idName=" . . . " id=" . . . " changeNumber=" . . ."
           versionHistory=" . . . " creator=" . . . ">_{0 . . . unbounded}
      <hs:name xml:lang=" . . . ">_{0 . . . unbounded}</hs:name>
      <hs:description xml:lang=" . . . ">_{1 . . . 1}</hs:description>
      <hs:implies ref=" . . . ">_{0 . . . unbounded}</hs:implies>
      <hs:cat ref=" . . . ">_{0 . . . unbounded}</hs cat>
      {any}
   </hs: catDef>
   <m:widget id=" . . . " changeNumber=" . . . " versionHistory=" . . . "
           creator=" . . . ">_{0 . . . unbounded}
      <m:cat ref=" . . . ">_{0 . . . unbounded}</m:cat>
      <m:name xml:lang=" . . . ">_{1 . . . 1}</m:name>
      <m:unitPrice currency=" . . . ">_{1 . . . 1}</m:unitPrice>
      {any}
   </m:widget>
   <m:order id=" . . . " changeNumber=" . . . " versionHistory=" . . . "
           creator=" . . . ">_{0 . . . unbounded}
           . . .
   </m:order>
   <hs:subscription id=" . . . " changeNumber=" . . . "
           versionHistory=" . . . " creator=" . . . ">_{0 . . . unbounded}
           . . .
   </hs:subscription>
</m:myWidgets>
```

The execution plans illustrated in FIGS. 9a–9f also will be described with reference to an example XML data manipulation language that includes various requests, including insertRequest, deleteRequest, replaceRequest, insertRequest with replaceExisting, updateRequest, createDocumentRequest, deleteDocumentRequest, and queryRequest, as discussed in more detail below. The execution plans for createDocumentRequest and deleteDocumentRequest include a single L-steps, marked with a special flag, CreateDocument/DeleteDocument.

Insert requests are converted to a sequence of (SELECT, [TEST], INSERT) tuples. For example, the insert request illustrated in Table II produces the execution plan shown in FIG. 9a.

TABLE II (insertRequest)

```
<hs:insertRequest select="/m:myWidgets/m:widget">
    <m:cat ref="manufacturer_acme"/>
    <m:unitPrice currency="PLN">19.00</m:unitPrice>
</hs:insertRequest>
```

Figure 9A:
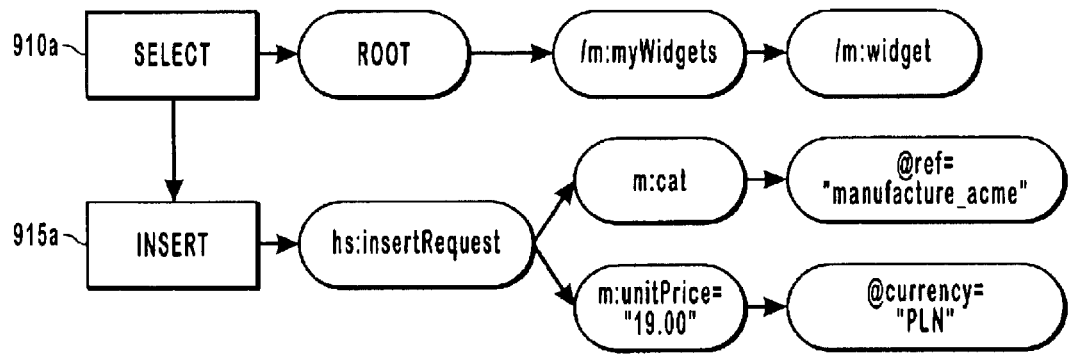
FIGS. 9a–9f are block diagrams illustrating example sequences of logical operations that represent an intermediate form of XML data manipulation language requests.

The execution plan illustrated in FIG. 9a includes: a SELECT L-step 910a, followed by ITEMREF L-nodes for ROOT, /m:myWidgets, and /m:widget, and an INSERT L-step 915a, followed by ITEMREF L-nodes for hs:insertrequest (the root is ignored) and the data to insert, /m:cat having @ref="manufacturer_acme" as an attribute and /m:unitPrice="19.00" having @currency="PLN" as an attribute. Because the root node of the INSERT XML tree is ignored (as described above with reference to FIG. 8d), XDB reuses the existing XML child node list (the list containing m:cat and m:unitPrice).

Execution plans for delete requests look almost identical to those of insert requests. For example, the delete request illustrated in Table III produces the execution plan shown in FIG. 9b.

TABLE III (deleteRequest)

```
<hs:deleteRequest select="//m:widget"/>
```

Figure 9B:
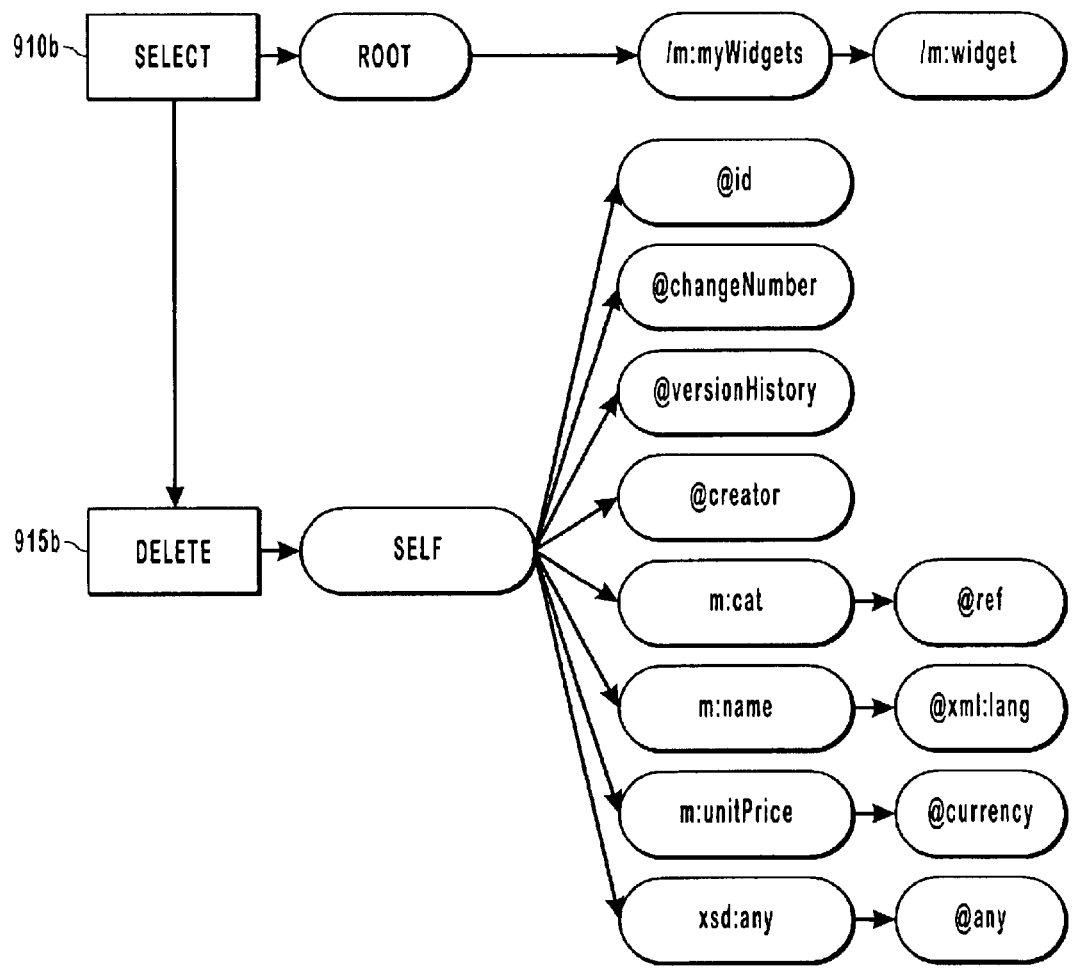

The execution plan illustrated in FIG. 9b includes a SELECT L-step 910b and a DELETE L-step 915b. The SELECT L-step 910b contains ITEMREF L-nodes for ROOT, /m:myWidgets, and /m:widget. The DELETE L-step 915b is followed by an ITEMREF SELF L-node with a child node for each /m:widget schema item (refer to Table I), including attributes and data. Specifically, the child nodes include ITEMREF L-nodes for @id, @changeNumber, @versionHistory, @creator, /m:cat and @ref, /m:name and @xml:lang, /m:unitPrice and @currency, and /xsd:any and @any. As indicated above, /xsd: any and @any account for any user-defined data.

Replace requests are basically combinations of deletes and inserts. These two steps, however, are slightly different than usual. DELETE does not delete the top-level node, its item ID, change number, version history, and creator, and INSERT does not insert them. Both DELETE and INSERT steps are annotated with a for-replace flag (DELETE.R and INSERT.R respectively). The replace request illustrated in Table IV produces the execution plan shown in FIG. 9c.

TABLE IV (replaceRequest)

```
<hs:replaceRequest select="//m:widget[@id=' . . . ']">
    <m:widget>
```

TABLE IV-continued (replaceRequest)

```
        <m:cat ref="m:bigWidget"/>
        <m:name xml:lang="pl">TurboMaster 3000</m:name>
        <m:unitPrice currency="PLN">8.99</m:unitPrice>
    </m:widget>
</hs:replaceRequest>
```

Figure 9C:
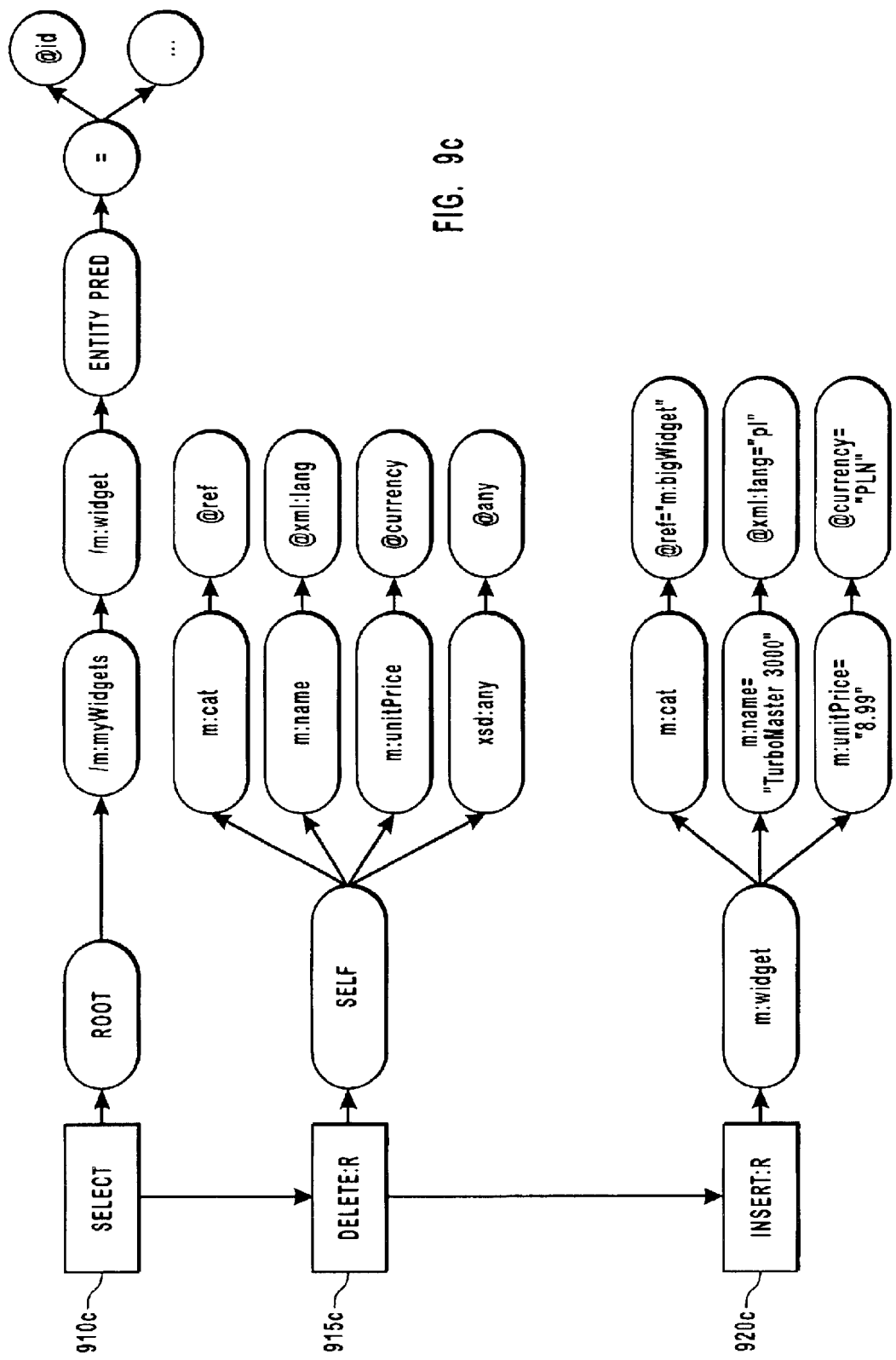

The execution plan illustrated in FIG. 9c includes a SELECT L-step 910c, a DELETE. R L-step 915c and an INSERT. R L-step 920c. The SELECT L-step 910c contains ITEMREF L-nodes for ROOT, /m:myWidgets, and /m:widget, and an ENTITY PRED OPERATION L-node, followed by the predicate to satisfy—an OPERATION L-node for the entity function =, an ITEMREF L-node for the @id attribute of /m:widget, and an L-node ". . . ", representing what to compare to the @id attribute. The DELETE.R L-step 915c is followed by an ITEMREF SELF L-node with a child node for each /m:widget schema item (refer to Table I), including data, but not attributes. Specifically, the child nodes include ITEMREF L-nodes for /m:cat and @ref, /m:name and @xml:lang, /m:unitPrice and @currency, and /xsd: any and @any. The INSERT.R L-step 920c is followed by ITEMREF L-nodes for m:widget (the root is ignored for inserts) and the data to insert, /m:cat with @ref="m:bigWidget" as an attribute, /m:name= "TurboMaster 3000" with @xml:lang="pl" as an attribute, and /m:unitPrice="8.99," with @currency="PLN" as an attribute.

An insert request may specify a replaceExisting option. This allows the caller to replace an exiting object, if one exists, or insert a new one, if the object does not exist. The insert request illustrated in Table V produces the execution plan shown in FIG. 9d.

TABLE V (insertRequest with replaceExisting)

```
<hs:insertRequest select="/m:mywidgets">
    <hs:options>
        <hs:replaceExisting select="./m:widget[@id = '1']"
            test="./@changeNumber = 2"/>
        <hs:useClientIds/>
    </hs:options>
    <m:widget id="1">
        . . .
    </m:widget>
</hs:insertRequest>
```

Figure 9D:
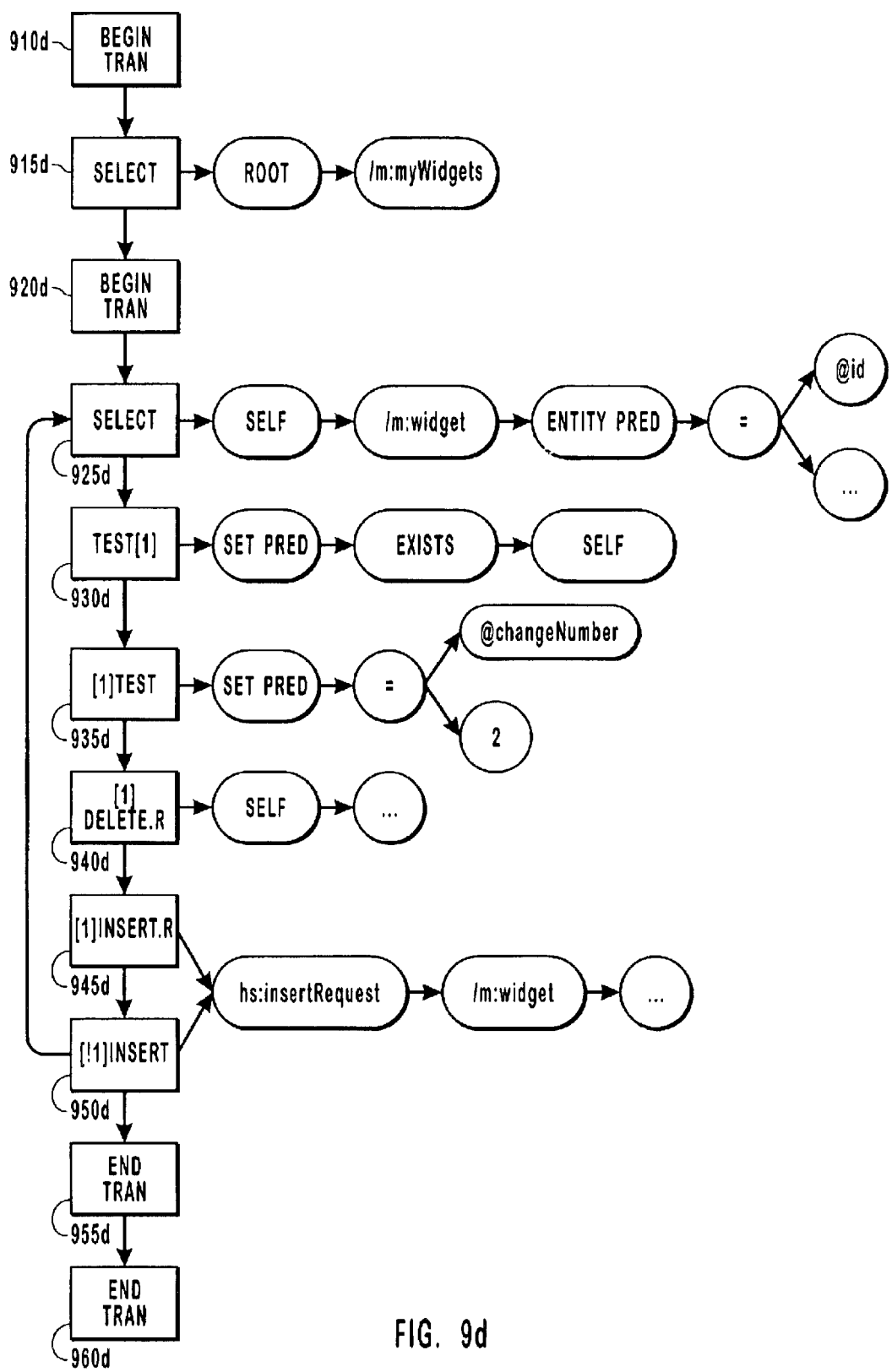

The execution plan diagram illustrated in FIG. 9d uses a new convention. A number in square brackets following TEST specifies which predicate bit in which to store the test result. A number in square brackets preceding the step name indicates the predicate bit upon which the step depends. The [!1]INSERT step depends on the first SELECT, and all other steps depend on their closest SELECT predecessors. As above, DELETE.R indicates a for-replace DELETE and INSERT.R indicates a for-replace INSERT. Note that the bodies of the two INSERT steps are shared. The execution plan illustrated in FIG. 9d includes a BEGIN TRAN L-step 910d, a SELECT L-step 915d, another BEGIN TRAN L-step 920d, another SELECT L-step 925d, two TEST L-steps 930d and 935d, a DELETE.R L-step 940d, an [1]INSERT.R L-step 945d and an [!1]INSERT L-step 950d, and two END TRAN L-steps 955d and 960d.

As indicated above, BEGIN TRAN 910d essentially pushes an error context on an abstract transaction stack and does not contain any L-nodes. The SELECT L-step 915d contains ITEMREF L-nodes for ROOT and /m:myWidgets. The second BEGIN TRAN 920d pushes an additional error context. The second SELECT L-step 925d contains ITEMREF L-nodes for SELF and /m:widget, followed by an ENTITY PRED OPERATION L-node and the predicate to satisfy—an OPERATION L-node for the entity function =, an ITEMREF L-node for the @id attribute of /m:widget, and an L-node ". . . ", representing what to compare to the @id attribute. The TEST[1] L-step 930d contains a SET PRED OPERATION L-node, a set-valued EXISTS OPERATION L-node, and a SELF ITEMREF L-node (corresponding to the select portion of the insert request in Table V). The [1]TEST L-step 935d contains a SET PRED OPERATION L-node and the predicate to satisfy—an OPERATION L-node for the entity function =, an ITEMREF L-node for the @changeNumber attribute of /m:widget, and a CONSTANT L-node 2, to compare to the @changeNumber attribute (corresponding to the test portion of the insert request in Table V).

The [1]DELETE.R L-step 940d contains an ITEMREF SELF L-node, followed by a child node for each /m:widget schema item (which are abbreviated in FIG. 9d with ". . . "), including data, but not attributes. The [1]INSERT.R L-step 945d contains ITEMREF L-nodes for hs:insertRequest (recall that the root is ignored for inserts) and the data to insert for /m:widget (also abbreviated in FIG. 9d with ". . . "). Note that the [!1]INSERT L-step 950d and the [1]INSERT.R L-step 945d share the same body. The END TRAN L-steps 955d and 960d pop the error contexts from abstract transaction stack that the BEGIN TRAN L-steps 910d and 920d pushed.

Update requests combine insertRequest, deleteRequest, and replaceRequest. The requests are encapsulated in update blocks, each of which specifies it own atomic transaction. Update block transaction boundaries are expressed using BEGIN TRAN and END TRAN L-steps. The BEGIN TRAN defines the error handling mode for each transaction. In addition to establishing a transaction context, update blocks establish a location context via their own XPath select statements. Individual request atoms (insertRequest, etc.) have select statements, but within updateRequest, they are relative to the update block's select statement. Accordingly, there are two types of SELECT steps: absolute and relative. Relative select steps begin with a SELF ITEMREF node or a UNION of SELF ITEMREF nodes, as described above. The update request in Table VI produces the execution plan shown in FIG. 9e.

TABLE VI (updateRequest)

```
<hs updateRequest>
    <hs:updateBlock select="//m:widget[@id='4']"
        errorMode="rollbackBlockAndFail">
        <hs:replaceRequest select="./m:cat/@ref">
            <hs:attribute name="ref" value="m:smallwidget"/>
        </hs:replaceRequest>
        <hs:insertRequest select=".">
            <hs:cat ref="m:formerlyBigwidget"/>
        </hs:insertRequest>
    </hs:updateBlock>
    <hs:updateBlock select="//m:widget[@id='7']"
        errorMode="rollbackBlockAndFail">
        <hs:replaceRequest select="./m:cat/@ref">
            <hs:attribute name="ref" value="m:smallWidget"/>
        </hs:replaceRequest>
        <hs:insertRequest select=".">
            <m:cat ref="m:formerlyBigWidget"/>
```

TABLE VI-continued (updateRequest)

```
        </hs:insertRequest>
    </hs:updateBlock>
</hs:updateRequest>
```

Figure 9E:
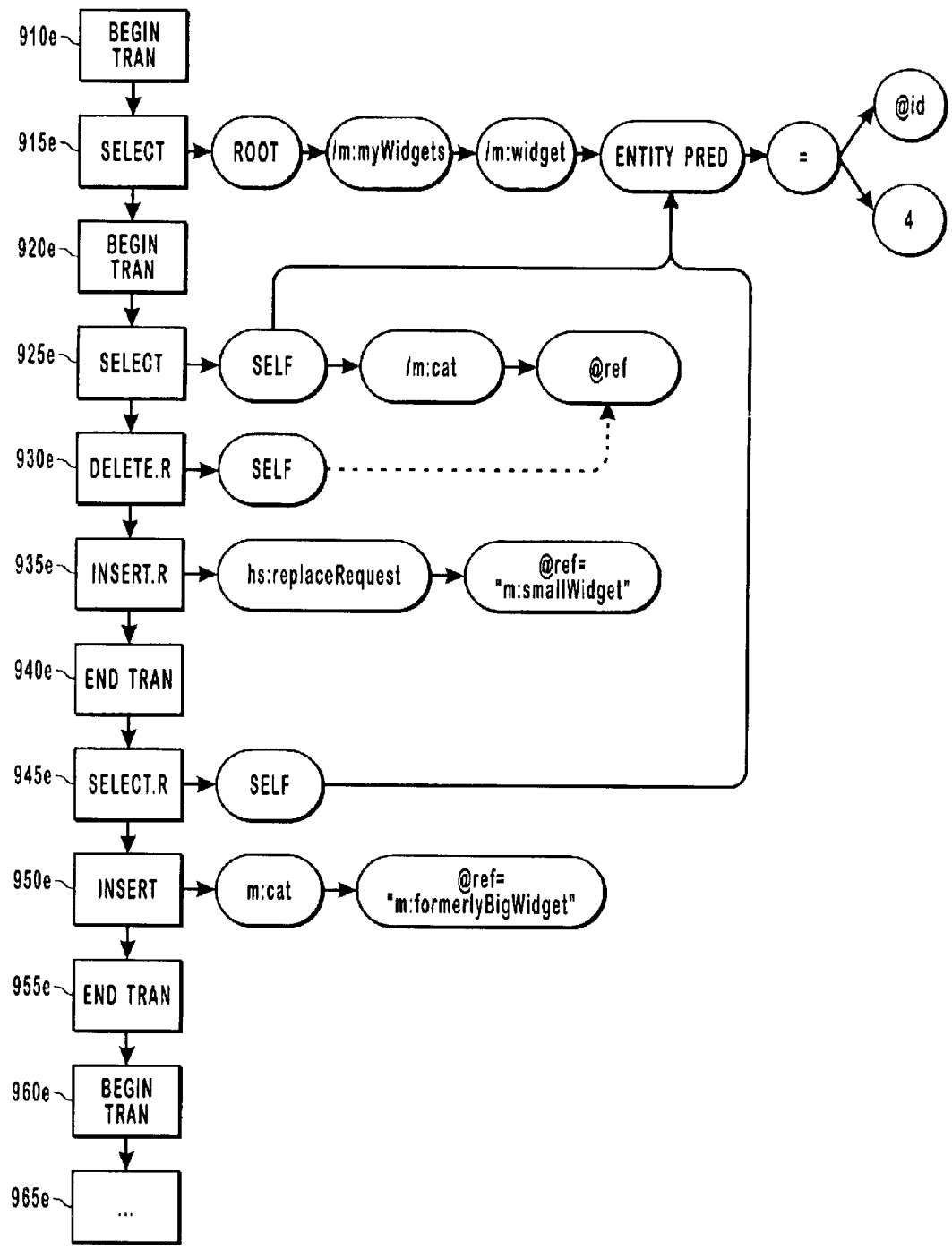

The execution plan illustrated in FIG. 9e includes a top-level BEGIN TRAN L-step 910e, a SELECT L-step 915e, a nested BEGIN TRAN L-step 920e, another SELECT L-step 925e, a DELETE.R L-step 930e, an INSERT.R L-step 935e, an END TRAN L-step 940e for the nested BEGIN TRAN 920e, a SELECT.R L-step 945e, an INSERT L-step 950e, an END TRAN L-step 955e for the top-level BEGIN TRAN 910e, a new top-level BEGIN TRAN L-step 960e, and so on for the next transaction of Table VI (as indicated by box 965e containing " . . . ").

As described above, BEGIN TRAN 910e essentially pushes an error context on an abstract transaction stack and does not contain any L-nodes. The SELECT L-step 915e contains ITENREF L-nodes for ROOT, /m:myWidgets, /m:widget, and an ENTITY PRED OPERATION L-node with the predicate to satisfy—an OPERATION L-node for the entity function =, an ITEMREF L-node for the @id attribute of /m:widget, and a CONSTANT L-node 4, to compare to the @id attribute.

The second BEGIN TRAN 920e pushes an additional error context. The second SELECT L-step 925e contains ITEMREF L-nodes for SELF (referencing the ENTITY PRED OPERATION L-node of SELECT L-step 915e) and /m:cat, followed by an ITEMREF L-node for the @ref attribute of /m:cat. The DELETE.R L-step 930e contains a SELF ITEMREF L-node, that references the @ref attribute of /m:cat from the foregoing SELECT L-step 925e. The INSERT.R L-step 935e contains ITEMREF L-nodes for hs:insertRequest (recall that the root is ignored for inserts) and the data to insert ("m:smallwidget") for the @ref attribute of /m:cat. The END TRAN L-step 940e pops the error context from abstract transaction stack for the nested BEGIN TRAN L-step 920e.

The SELECT.R L-step 945e contains a SELF ITEMREF L-node that references the ENTITY PRED OPERATION L-node of SELECT L-step 915e. The INSERT L-step 950e contains ITEMREF L-nodes for m:cat (recall that the root is ignored for inserts) and the data to insert ("m:formerlyBigWidget") for the @ref attribute of /m:cat. The END TRAN L-step 955e pops the error context that corresponds to the top-level BEGIN TRAN L-step 910e. A new top-level BEGIN TRAN L-step 960e begins the transaction for the next update block (see Table VI), which is represented by " . . . " in box 965e.

Query requests are composite requests containing atoms of two types: xpQuery and changeQuery. Each atom is converted to a few steps, which are appended to the end of the execution plan. XpQuery atoms become (SELECT, [TEST], QUERY, OUTPUT) tuples, and changeQuery atoms become (SELECT, [TEST], QUERY, OUTPUT, QUERY DEL, OUTPUT) tuples. For changeQuery (used in one embodiment to query data for synchronizing replicated data stores), the base change number is added as a predicate to the SELECT L-tree. The query request illustrated in Table VII produces the execution plan shown in FIG. 9f.

TABLE VII (queryRequest)

```
<hs:queryRequest>
    <hs:xpQuery select="/"/>
    <hs:changeQuery select="/m:myWidgets/m:widget"
        baseChangeNumber="76"/>
</hs:queryRequest>
```

Figure 9F:
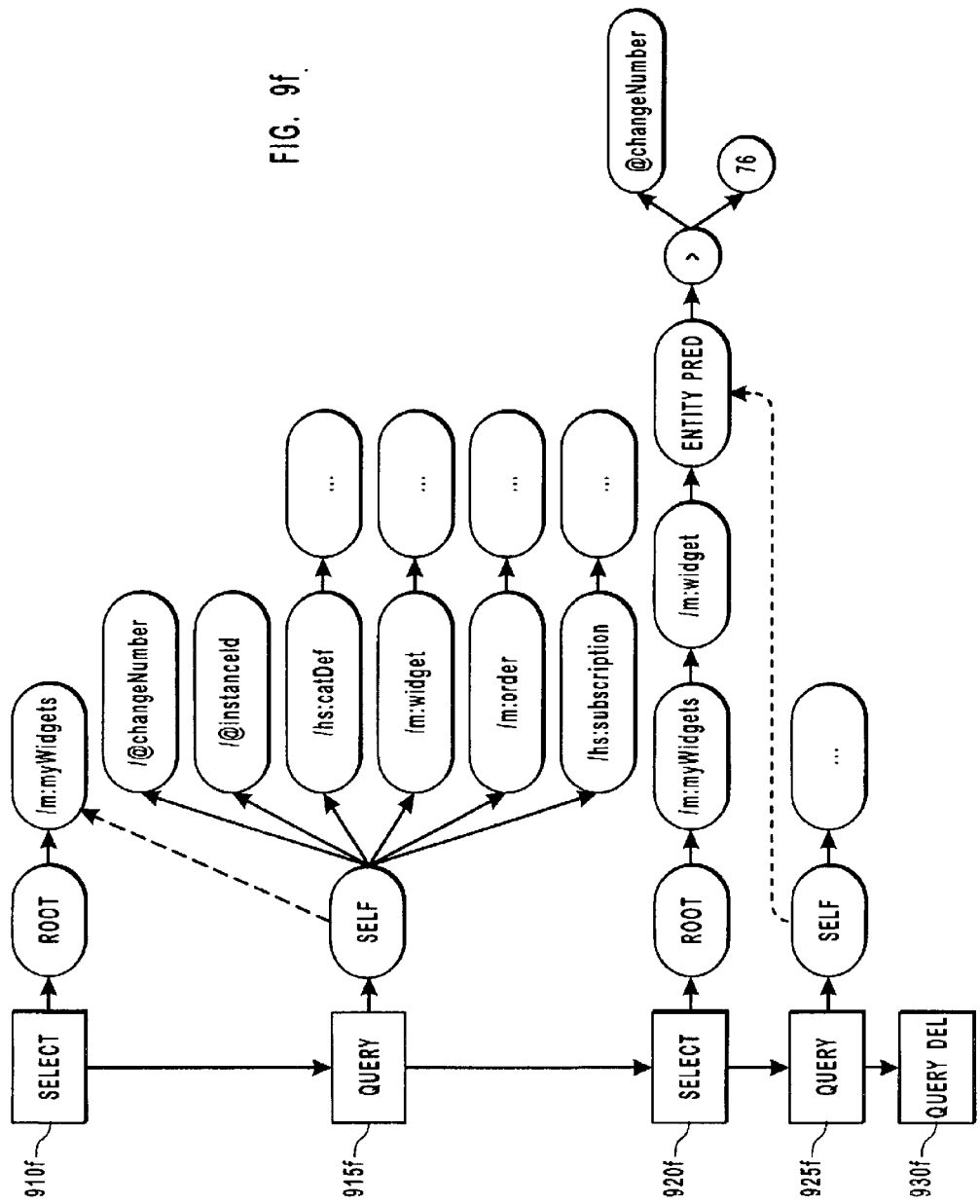

The execution plan illustrated in FIG. 9f includes a SELECT L-step 910f, a QUERY L-step 915f, another SELECT L-step 920f, another QUERY L-step 925f, and a QUERY DEL L-step 935f. The SELECT L-step 910f contains ITEMREF L-nodes for ROOT and /m:myWidgets. The QUERY L-step 915f is followed by an ITEMREF SELF L-node with a child node for each /m:mywidgets schema item (refer to Table I), including attributes and data. Specifically, the child nodes include ITEMREF L-nodes for @changeNumber, @instanceId, /hs:catDef and its attributes and data (". . . "), /m:widget and its attributes and data (" . . . "), /m:order and its attributes and data (". . . "), and /hs:subscription and its attributes and data (" . . . ").

The SELECT L-step 920f contains a SELF ITEMREF L-node for ROOT, /m:myWidgets, /m:widget, and an ENTITY PRED OPERATION L-node with the predicate to satisfy—an OPERATION L-node for the entity function >, an ITEMREF L-node for the @changeNumber attribute of /m:widget, and a CONSTANT L-node 76, to compare to the @changeNumber attribute. The QUERY L-step 925f contains ITEMREF L-nodes for SELF (referencing the ENTITY PRED OPERATION L-node of SELECT L-step 920f), followed by an ITEMREF L-nodes for the corresponding /m:widget data and attributes (which are abbreviated as " . . . "). The QUERY DEL L-step 930f does not contain any L-nodes. As described above, QUERY DEL L-steps are similar to QUERY steps, except they do not retrieve existing data, but rather data that has been deleted. One possible motivation for QUERY DEL is to support data replication and synchronization.

In one embodiment, XDB relates to a family of services that provide identity-based or identity-centric access to data, such as contacts, documents, email, etc. An identity may reference an individual, a group, an organization, a project, a document, a location, a device, or any other identifiable entity. In general terms, identity-based data is managed according to the identity that owns the data, rather than the application that accesses the data. Each identity may be associated with various data objects, potentially differing in type, that are owned by the identity. The various data objects may be organized according to a data format or schema that is suited to the particular type of data object. Specific identity-based data may be accessed by specifying the data type or schema of the desired data and the associated identity. The services, schemas, and data are often designated as myContacts, myDocuments, mylnbox, mywidgets, etc. Describing embodiments of the present invention in terms of identity-based services, however, is merely one example and should not be interpreted as necessarily imposing any limitation on the invention's scope.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

For example, a step for accepting an initial request to manipulate data of an underlying data store provider may include an act of receiving an initial request that is structured in accordance with an XML data manipulation language, whereas the data to manipulate is structured in accordance with a format supported by the data store provider. A step for representing the initial request in an intermediate form may include an act of creating an intermediate representation of the initial request that is suitable for conversions into any of one or more requests supported by any of one or more data store providers. A step for producing an initial native request from the intermediate form may include an act of converting the intermediate representation of the initial request into an initial native request supported by the data store provider.

A step for producing one or more initial stored procedures comprising one or more structured query language statements may include an act of creating one or more stored procedures corresponding to the initial request. A step for preserving the one or more initial stored procedures for later use may include an act of storing the one or more initial stored procedures. A step for accepting a subsequent request at a second computer system may include an act of receiving a subsequent request at the second computer system.

A step for representing the subsequent request in an intermediate form may include an act of creating an intermediate representation of the subsequent request where at least a portion of the intermediate representation corresponds to at least one of the one or more initial stored procedures. A step for producing a subsequent native request from the intermediate representation may include an act of converting the intermediate representation of the subsequent request into a subsequent native request supported by the data store provider, where the subsequent native request comprises the at least one of the one or more initial stored procedures.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 10:
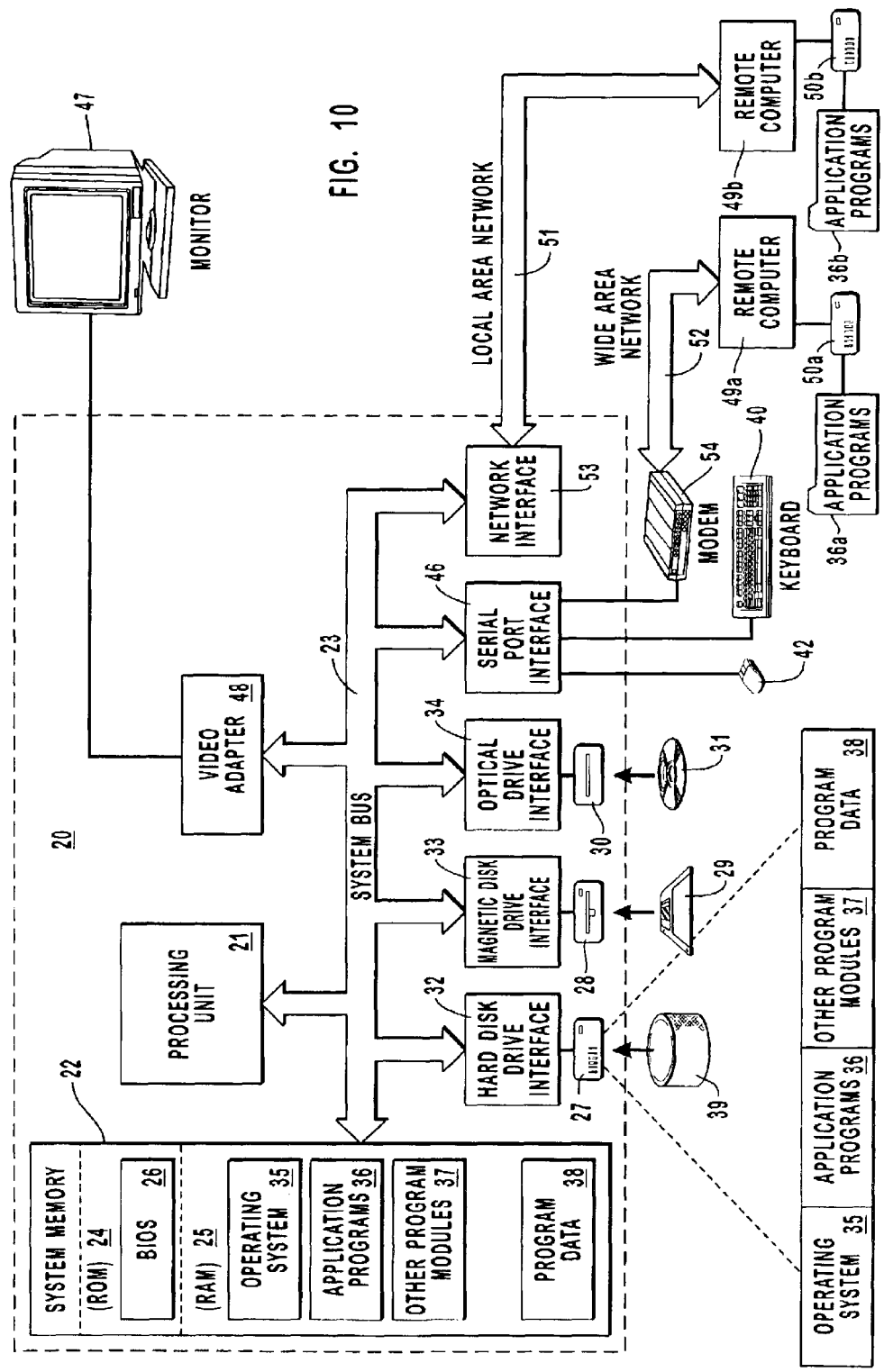
FIG. 10 illustrates an example system that provides a suitable operating environment for the present invention.

FIG. 10 and the following discussion are intended to provide a brief, general description of a suitable computing environment in which the invention may be implemented.

Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 10, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disc drive 30 for reading from or writing to removable optical disc 31 such as a CD-ROM or other optical media. The magnetic hard disk drive 27, magnetic disk drive 28, and optical disc drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disc 31, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 39, magnetic disk 29, optical disc 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 10. The logical connections depicted in FIG. 10 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer network that provides access to data described by an eXtensible Markup Language ("XNW") schema, wherein storage for the data is abstracted flow an XML data manipulation language for interacting with the data such that any of one or more storage mechanisms may be implemented without necessarily requiring corresponding changes to the XML data manipulation language, a method of data access comprising acts of:

receiving, at a first computer system, an initial request to manipulate data of an underlying data store provider, wherein the initial request is structured in accordance with an XML data manipulation language, and wherein the data to manipulate is structured in accordance with a format dictated by the data store provider;

creating one or more initial stored procedures corresponding to the initial request;

receiving, at a second computer system, a subsequent request to manipulate the data of the underlying data store provider;

creating an intermediate representation of the subsequent request that is suitable for conversion into any of one or more requests supported by any of one or more data store providers, wherein at least a portion of the intermediate representation of the subsequent response corresponds to at least one of the one or more initial stored procedures; and converting the intermediate representation of the subsequent request into a subsequent native request supported by the data store provider, wherein the subsequent native request comprises the at least one of the one or more initial stored procedures.

2. A method as recited in claim 1, further comprising an act of storing the one or more initial stored procedures.

3. A method as recited in claim 1, wherein the initial request comprises at least one of an insert, delete, update, replace, or query request.

4. A method as recited in claim 1, wherein converting the intermediate representation of the subsequent request comprises an act of creating a generic category representation of the intermediate representation of the subsequent request and thereafter converting the generic category representation into the specific subsequent native request supported by the data store provider.

5. A method as recited in claim 4, wherein the generic category representation corresponds to relational database management systems in general, and wherein the specific subsequent native request corresponds to a specific implementation of a relational database management system.

6. A method as recited in claim 1, wherein the intermediate representation of the subsequent request comprises one or more logical executions steps, including at least one of: (i) a begin transaction step, (ii) an end transaction step, (iii) a select step, (iv) a test step, (v) a query step, (vi) an insert step, and (vii) a delete step.

7. For a computer network that provides access to data described by an eXtensible Markup Language ("XML") schema, wherein storage for the data is abstracted from an XML data manipulation language for interacting with the data such that any of one or more storage mechanisms may be implemented without necessarily requiring corresponding changes to the XML data manipulation language, a computer program product comprising a computer readable medium carrying computer executable instructions that implement a method of data access, the method comprising acts of:

receiving, at a first computer system, an initial request to manipulate data of an underlying data store provider, wherein the initial request is structured in accordance with an XML data manipulation language, and wherein the data to manipulate is structured in accordance with a format dictated by the data store provider;

creating one or more initial stored procedures corresponding to the initial request;

receiving, at a second computer system, a subsequent request to manipulate the data of the underlying data store provider;

creating an intermediate representation of the subsequent request that is suitable for conversion into any of one or more requests supported by any of one or more data store providers, wherein at least a portion of the intermediate representation of the subsequent response corresponds to at least one of the one or more initial stored procedures; and converting the intermediate representation of the subsequent request into a subsequent native request supported by the data store provider, wherein the subsequent native request comprises the at least one of the one or more initial stored procedures.

8. A computer program product as recited in claim 7, further comprising an act of storing the one or more initial stored procedures.

9. A computer program product as recited in claim 7, wherein the initial request comprises at least one of an insert, delete, update, replace, or query request.

10. A computer program product as recited in claim 7, wherein converting the intermediate representation of the subsequent request comprises an act of creating a generic category representation of the intermediate representation of the subsequent request and thereafter converting the generic category representation into the specific subsequent native request supported by the data store provider.

11. A computer program product as recited in claim 7, wherein the generic category representation corresponds to relational database management systems in general, and wherein the specific subsequent native request corresponds to a specific implementation of a relational database management system.

12. A computer program product as recited in claim 7, wherein the intermediate representation of the subsequent request comprises one or more logical executions steps, including at least one of: (i) a begin transaction step. (ii) an end transaction step, (iii) a select step, (iv) a test step, (v) a query step, (vi) an insert step, and (vii) a delete step.

* * * * *